(12) United States Patent
Van Mill et al.

(10) Patent No.: US 12,089,534 B2
(45) Date of Patent: *Sep. 17, 2024

(54) GRAIN CART WITH FOLDING AUGER

(71) Applicant: Unverferth Manufacturing Company, Inc., Kalida, OH (US)

(72) Inventors: Michael D. Van Mill, Shell Rock, IA (US); Ronald J. Schlimgen, Shell Rock, IA (US)

(73) Assignee: UNVERFERTH MANUFACTURING COMPANY, INC., Kalida, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,832

(22) Filed: Jun. 1, 2023

(65) Prior Publication Data

US 2023/0380348 A1 Nov. 30, 2023

Related U.S. Application Data

(63) Continuation of application No. 17/747,176, filed on May 18, 2022, now Pat. No. 11,700,791, which is a continuation of application No. 16/752,213, filed on Jan. 24, 2020, now Pat. No. 11,343,971, which is a continuation of application No. 15/595,309, filed on May 15, 2017, now Pat. No. 10,542,676.

(60) Provisional application No. 62/348,277, filed on Jun. 10, 2016.

(51) Int. Cl.
*A01D 90/10* (2006.01)
*A01D 41/12* (2006.01)
*B60D 1/155* (2006.01)
*B60P 1/42* (2006.01)

(52) U.S. Cl.
CPC ............. *A01D 90/10* (2013.01); *B60D 1/155* (2013.01); *B60P 1/42* (2013.01); *A01D 41/1217* (2013.01)

(58) Field of Classification Search
CPC ...... A01B 59/004; A01D 90/10; B60D 1/155; B60D 1/44; B60P 1/40; B60P 1/42
See application file for complete search history.

(56) References Cited

U.S. PATENT DOCUMENTS

| | | |
|---|---|---|
| 3,244,434 A | 4/1966 | Reed et al. |
| 5,013,208 A | 5/1991 | Grieshop |
| 5,409,344 A | 4/1995 | Tharaldson |
| 5,538,388 A | 7/1996 | Bergkamp et al. |
| 6,767,174 B2 | 7/2004 | Cresswell |

(Continued)

FOREIGN PATENT DOCUMENTS

DE 3414610 A1 10/1985

*Primary Examiner* — James Keenan
(74) *Attorney, Agent, or Firm* — ROTHWELL, FIGG, ERNST & MANBECK, P.C.

(57) ABSTRACT

A grain cart and foldable auger assembly having an upper auger assembly portion with a discharge portion, a lower auger assembly portion with an intake portion, and a joint that allows the upper auger assembly portion to be moved between operating and transport positions. When in an operating position, the upper auger portion and the lower auger portion are offset from each other by an operating offset angle. The grain cart also has a hitch for allowing the grain cart to be towed. The discharge portion is forward of the hitch when in the operating position. Embodiments of the present invention provide, for example, increased forward and side reach, additional storage capacity of the hopper, increased discharge rate from the hopper, and a more compact transport position.

16 Claims, 19 Drawing Sheets

(56) References Cited

U.S. PATENT DOCUMENTS

| | | |
|---|---|---|
| 6,893,202 B2 | 5/2005 | Hunt |
| 7,134,830 B2 | 11/2006 | Wood |
| 7,513,521 B2 | 4/2009 | Posselius et al. |
| 8,047,757 B1 | 11/2011 | Wood |
| 8,167,527 B2 | 5/2012 | Kinzenbaw |
| 8,544,574 B2 | 10/2013 | Fegley et al. |
| 8,678,420 B2 | 3/2014 | Gallego et al. |
| 8,702,368 B2 | 4/2014 | Van Mill et al. |
| 9,039,340 B2 | 5/2015 | Van Mill et al. |
| 9,061,834 B2 | 6/2015 | Mulder et al. |
| 9,187,259 B2 | 11/2015 | Van Mill et al. |
| 2010/0254792 A1 | 11/2010 | Kinzenbaw |
| 2015/0203019 A1 | 7/2015 | Kinzenbaw |
| 2015/0237804 A1 | 8/2015 | Van Mill et al. |
| 2017/0049039 A1 | 2/2017 | Houck |
| 2017/0055454 A1 | 3/2017 | Michael et al. |
| 2017/0182921 A1 | 6/2017 | Van Mill |

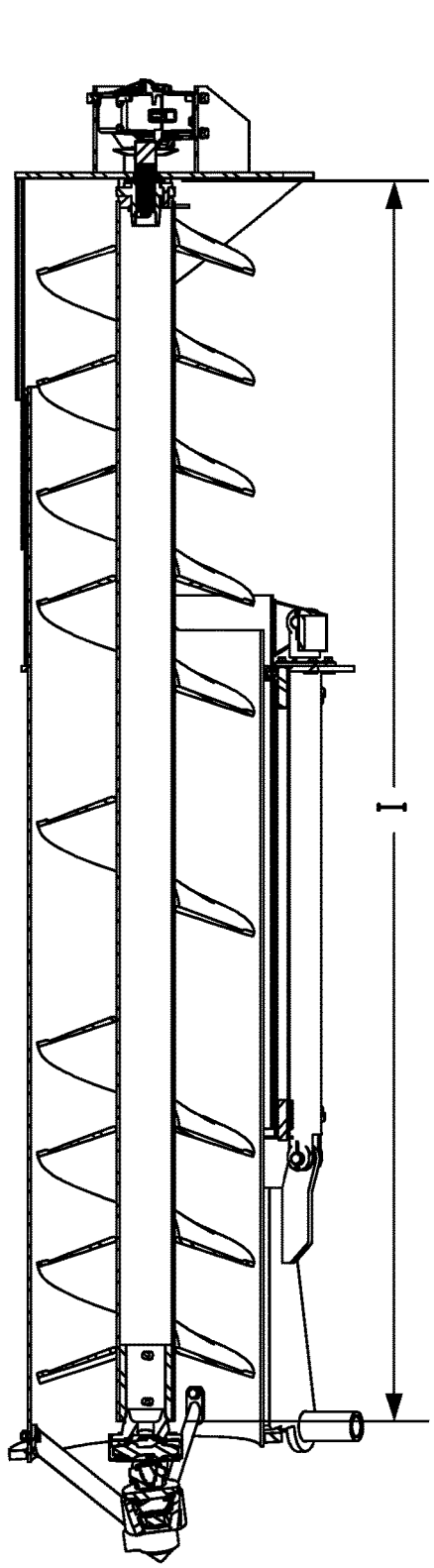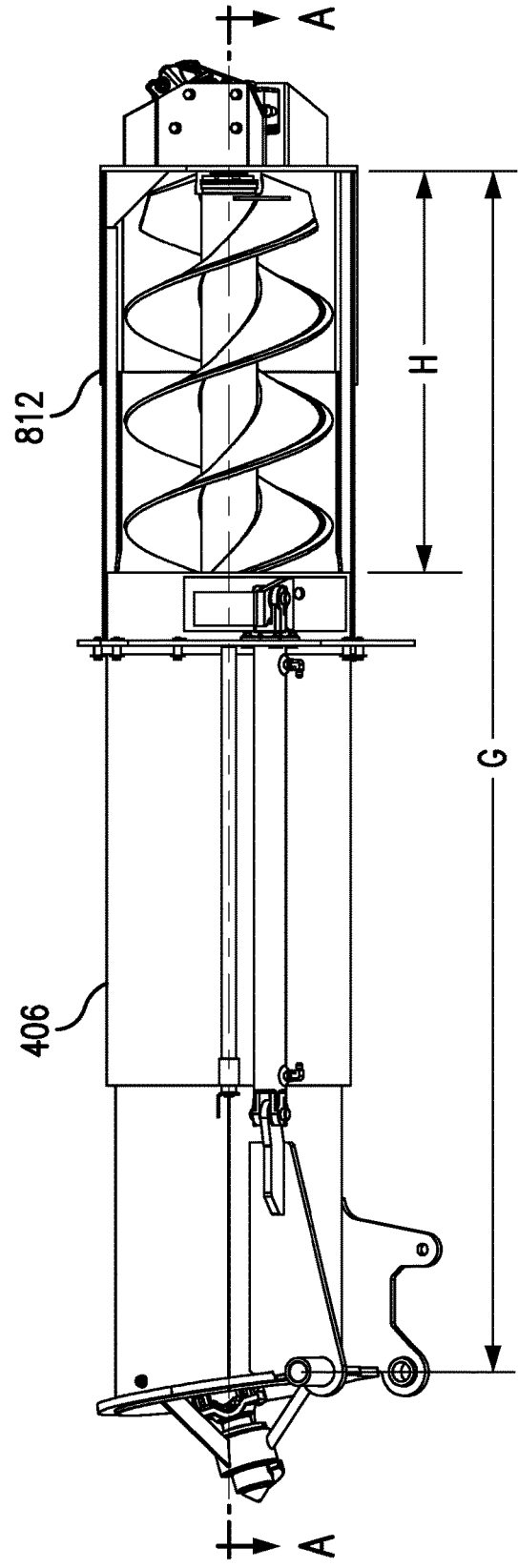
FIG. 8A
FIG. 8

GRAIN CART WITH FOLDING AUGER

CROSS REFERENCE OF RELATED APPLICATION

This application is a Continuation of Ser. No. 17/747,176, filed May 18, 2022, now U.S. Pat. No. 11,700,791, which is a Continuation of Ser. No. 16/752,213, filed Jan. 24, 2020, now U.S. Pat. No. 11,343,971, which is a Continuation of Ser. No. 15/595,309, filed May 15, 2017, now U.S. Pat. No. 10,542,676, which claims the benefit under 35 U.S.C. § 119(e) of the filing date of provisional patent application Ser. No. 62/348,277 filed Jun. 10, 2016, the disclosures of which are incorporated herein by reference in its entirety.

FIELD OF INVENTION

The present invention relates generally to grain carts and, more particularly, to grain carts having folding augers.

BACKGROUND OF THE INVENTION

In agriculture, augers are frequently used to move material from a cart to another cart, silo, truck, or other storage facility. Augers used to move grain are known as grain augers and are frequently employed in grain carts. A typical grain auger includes an auger screw of constant diameter and pitch that is housed inside a tubular housing or shaft to form an auger assembly. An intake portion of the auger assembly can draw from a hopper (usually by gravity) attached to it to receive grain or other material from the hopper and the other end (i.e., the discharge end) has a chute or the like to guide the grain or other material into its destination. It is well known in the art to attach an auger assembly to a grain cart to off-load the grain cart.

As a grain cart with a fully extended auger can be somewhat unwieldy during transport, many grain carts employ folding augers that can open to an operating position and fold to a transport position. In general, a folding auger assembly includes a lower auger assembly and an upper auger assembly. When in the operating position, the upper and lower auger assemblies function as one co-linear auger. When in the transport position, the upper auger portion folds to reduce the height and the width of the grain cart. Folding the auger assembly makes it easier to transport the grain cart on roads.

U.S. Patent Application Publication Nos. 2004/0184905, 2007/0119688, and 2005/0238470 as well as U.S. Pat. Nos. 5,655,872, 5,340,265, 4,846,621, 5,628,608, 6,422,376 all disclose folding augers with distinct disadvantages. For instance, none of them maximize side and forward reach when in an operating position and minimize transport size when in a transport position. Another disadvantage of prior art folding augers is that the folding motion may not clear the cab of some tractors, making it difficult to convert the auger between operating and transport positions.

Grain carts with folding augers come in two main varieties: front-folding augers and side-folding augers. Front-folding augers fold along a front of the grain cart and typically the upper auger assembly must be no longer than the width of the grain cart (or the hypotenuse from the pivot point to the ground if it is a diagonally-folding front auger), otherwise it would extend beyond a side wall of the grain cart when in the transport position making travel on a roadway dangerous. An example of a front-folding auger may be found in co-owned U.S. Pat. No. 9,039,340, the disclosure of which is herein incorporated by reference in its entirety. Side-folding augers are typically longer than front-folding augers, and can achieve greater height and reach than front-folding augers. However, a disadvantage with existing side-folding augers is the limited visibility of the discharge operation from the viewpoint of an operator in a tractor towing the grain cart due to the limited forward reach of existing side-folding augers.

SUMMARY OF THE INVENTION

One aspect of the present invention provides a grain cart comprising a wheeled frame and a container mounted on the frame and configured to hold a quantity of grain, the container having front, rear and laterally opposed side walls. The grain cart further includes a folding auger assembly having upper and lower auger assembly portions connected by a joint assembly. The lower auger assembly portion has a lower auger housing with first and second ends and a lower auger portion rotatably disposed in the lower auger housing, and the upper auger assembly portion has an upper auger housing with first and second ends and an upper auger portion rotatably disposed in the upper auger housing. The first end of the lower auger housing has an intake opening proximate a bottom of the container to receive grain and the second end of the lower auger housing is disposed adjacent a front corner of the container where one of the laterally opposed side walls intersects the front wall. The first end of the upper auger housing is disposed adjacent the second end of the lower auger housing and the second end of the upper auger housing has a discharge portion to discharge grain from the container. The joint assembly defines a pivot axis about which the upper auger assembly portion is pivotable relative to the lower auger assembly portion between an operating position in which the first end of the upper auger housing abuts the second end of the lower auger housing to permit grain to be discharged from the container and a transport position in which the upper auger assembly portion extends along the one of the laterally opposed side walls defining the front corner to facilitate transporting the grain cart. A longitudinal axis of the lower auger assembly portion extends upwardly, forwardly, and laterally outward relative to the front corner of the container and wherein a longitudinal axis of the upper auger assembly portion extends laterally outward relative to the longitudinal axis of the lower auger assembly portion thereby increasing side reach of the upper auger assembly portion. The upper assembly portion includes a first auger coupling portion and the lower auger assembly portion includes a second auger coupling portion, and wherein at least one of the first and second auger coupling portions is angularly offset from a longitudinal axis of at least one of the upper and lower auger housings and connected to a joint that allows the transfer of rotational motion through an angle. The first auger coupling portion is configured to releasably engage with the second auger coupling portion in the operating position, and the first auger coupling portion is configured to disengage from the second auger coupling portion. The joint transmits rotational forces through the angular offset when the first and second auger coupling portions are releasably engaged in the operating position. The grain cart also includes a hitch for allowing the grain cart to be towed, wherein the discharge portion is forward of the hitch when in the operating position.

In an embodiment, the discharge portion is configured to be visible from a window of a tractor towing the cart. In an embodiment, the grain cart further comprises a hitch for allowing the grain cart to be towed. In an embodiment, the discharge portion is forward of the hitch when in the operating position. In an embodiment, the discharge portion is forward of the hitch when in the operating position by a distance from 60 inches to 70 inches. In an embodiment, the discharge portion includes a discharge spout.

In an embodiment, the joint is a universal joint. In an embodiment, an angle of the joint formed by longitudinal axes of the upper and lower auger assembly portions is from 17° to 18° when in the operating position.

In an embodiment, the upper auger assembly portion does not extend beyond the rear wall when in the transport position. In an embodiment, the upper auger assembly portion extends beyond the rear wall when in the transport position by a distance no more than 5 inches. In an embodiment, the lower auger assembly portion forms an angle with the ground of from 22° to 26°.

In some embodiments, an angle formed by the upper auger assembly portion and said the lower auger assembly portion when in the transport position is from 25° to 55°, or from 30° to 40°. In some embodiments, the pivot axis is located behind a front-sloping portion of the front wall and in other embodiments, the pivot axis is located in front of a front-sloping portion of the front wall.

According to another aspect of the present invention, a grain cart includes a wheeled frame and a container mounted on the frame and configured to hold a quantity of grain, the container having front, rear and laterally opposed side walls. The grain cart also includes a side-folding auger assembly having upper and lower auger assembly portions connected by a joint assembly, the lower auger assembly portion having a lower auger housing with first and second ends and a lower auger portion rotatably disposed in the lower auger housing, and the upper auger assembly portion having an upper auger housing with first and second ends and an upper auger portion rotatably disposed in the upper auger housing. The grain cart also includes a hitch for allowing the grain cart to be towed. The upper auger assembly portion is pivotable relative to the lower auger assembly portion between an operating position in which grain is permitted to be discharged from the container and a transport position in which the upper auger assembly portion extends along one of the laterally opposed side walls. The upper auger includes a discharge portion to discharge grain from the container. The discharge portion is forward of the hitch when in the operating position. The upper auger assembly portion has a forward hitch reach and a side reach, wherein the forward hitch reach is a distance the discharge portion is forward of the hitch when in the operating position, and the side reach is a distance the discharge portion extends outward from the one of the laterally opposed side walls. In one exemplary embodiment, the forward hitch reach is at least 45% of the side reach.

In some embodiments, the forward hitch reach is at least 50% or at least 55% or at least 60% of the side reach.

According to another aspect of the present invention, a grain cart includes a wheeled frame and a container mounted on the frame and configured to hold a quantity of grain, the container having front, rear and laterally opposed side walls. The grain cart further includes a side-folding auger assembly. The grain cart further includes hitch assembly including a hitch for allowing the grain cart to be towed and a telescoping tongue. The hitch assembly is operable to adjust the length of the telescoping tongue.

In some embodiments, the grain cart further comprises a controller. In some embodiments, the controller is configured to cause the hitch assembly to adjust the length of the telescoping tongue so that the hitch assembly moves to a retracted position when one or more of a power take off (PTO), a driveshaft, and an auger begins rotating. In some embodiments, the controller is configured to cause the hitch assembly to adjust the length of the telescoping tongue so that the hitch assembly moves to an extended position when the one or more of the power take off (PTO), the driveshaft, and the auger stops rotating. In some embodiments, the controller is configured to cause the hitch assembly to adjust the length of the telescoping tongue so that the hitch assembly moves to an extended position when an unloading process has completed. In some embodiments, the controller is configured to cause the hitch assembly to adjust the length of the telescoping tongue so that the hitch assembly moves to a retracted position when an auger is moved to a transport position and wherein the controller is further configured to cause the hitch assembly to adjust the length of the telescoping tongue so that the hitch assembly moves to an extended position when the auger is moved to a transport position.

Advantages of embodiments of the present invention include increased forward and side reach, additional storage capacity of the hopper, increased discharge rate from the hopper, and a more compact transport position.

Other advantages of the present invention will be apparent to those skilled in the art upon reviewing the detailed description of the embodiments and the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable those skilled in the art to make and use the invention. In the drawings, like reference numbers indicate identical or functionally similar elements.

FIG. 8 depicts a view of the lower auger portion of a grain cart according to exemplary embodiments of the present invention.

FIG. 8A depicts section A-A of FIG. 8.

DETAILED DESCRIPTION OF EXEMPLARY EMBODIMENTS OF THE INVENTION

While the present invention may be embodied in many different forms, a number of illustrative embodiments are described herein with the understanding that the present disclosure is to be considered as providing examples of the principles of the invention and such examples are not intended to limit the invention to those embodiments described herein and/or illustrated herein.

Figure 1:
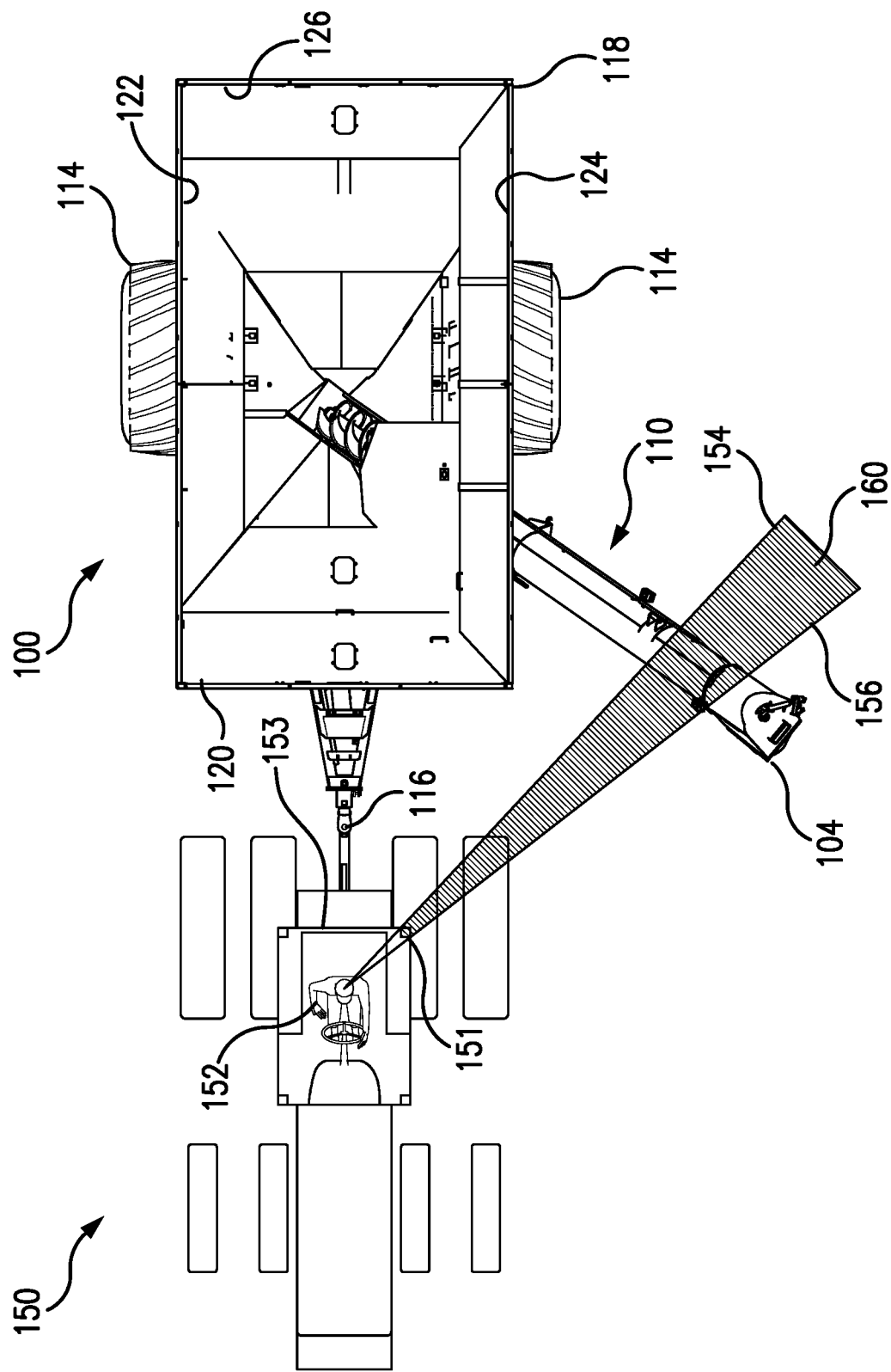
FIG. 1 depicts a top view of a related art side-folding grain cart.

FIG. 1 is a top view of a grain cart 100 such as is known in the related art. FIG. 1 depicts a grain cart 100 with a side-folding auger assembly 110 in an operating position. The grain cart 100 includes a grain holding container or hopper 118 mounted on a frame with wheels 114 and a hitch 116. The hopper 118 has a front wall or side 120, laterally opposed side walls 122 and 124, and a rear wall or side 126, which together define a grain holding space with an open top and a bottom. An intake or receiving portion of the auger assembly 110 is positioned in a sump proximate the base or bottom of the hopper 118 to draw grain from the bottom of the hopper into the auger assembly 110. The auger assembly 110 extends upwardly from the intake to a discharge portion 104 laterally and forwardly spaced from the hopper 118 to facilitate discharge of grain from the auger assembly into another container such as, for instance, another grain cart, semi-trailer, or rail car located to the side of the grain cart 100. The discharge portion 104 is positioned behind the hitch 116.

As shown in FIG. 1, the grain cart 100 is being towed by a tractor 150. Lines 154 and 156 emanate from operator 152 of the cab of the tractor 150. The shaded portion 160 between lines 154 and 156 illustrates the portion of the operator's view that is blocked by a vertical cab post 151. As is clear from FIG. 1, the operator's view of the unload operation is significantly impeded by the vertical cab post 151 due to the limited forward reach of the auger assembly 110. Also clear from FIG. 1 is that the operator must turn his or her head substantially backward to see the discharge portion 104 of the upper auger assembly 110 because the discharge portion 104 of the upper auger assembly is substantially behind the back wall 153 of the tractor cab.

Embodiments of the present invention achieve various advantages over cart 100 depicted in FIG. 1, and other prior art carts, as is apparent from the present disclosure.

Figure 2A:
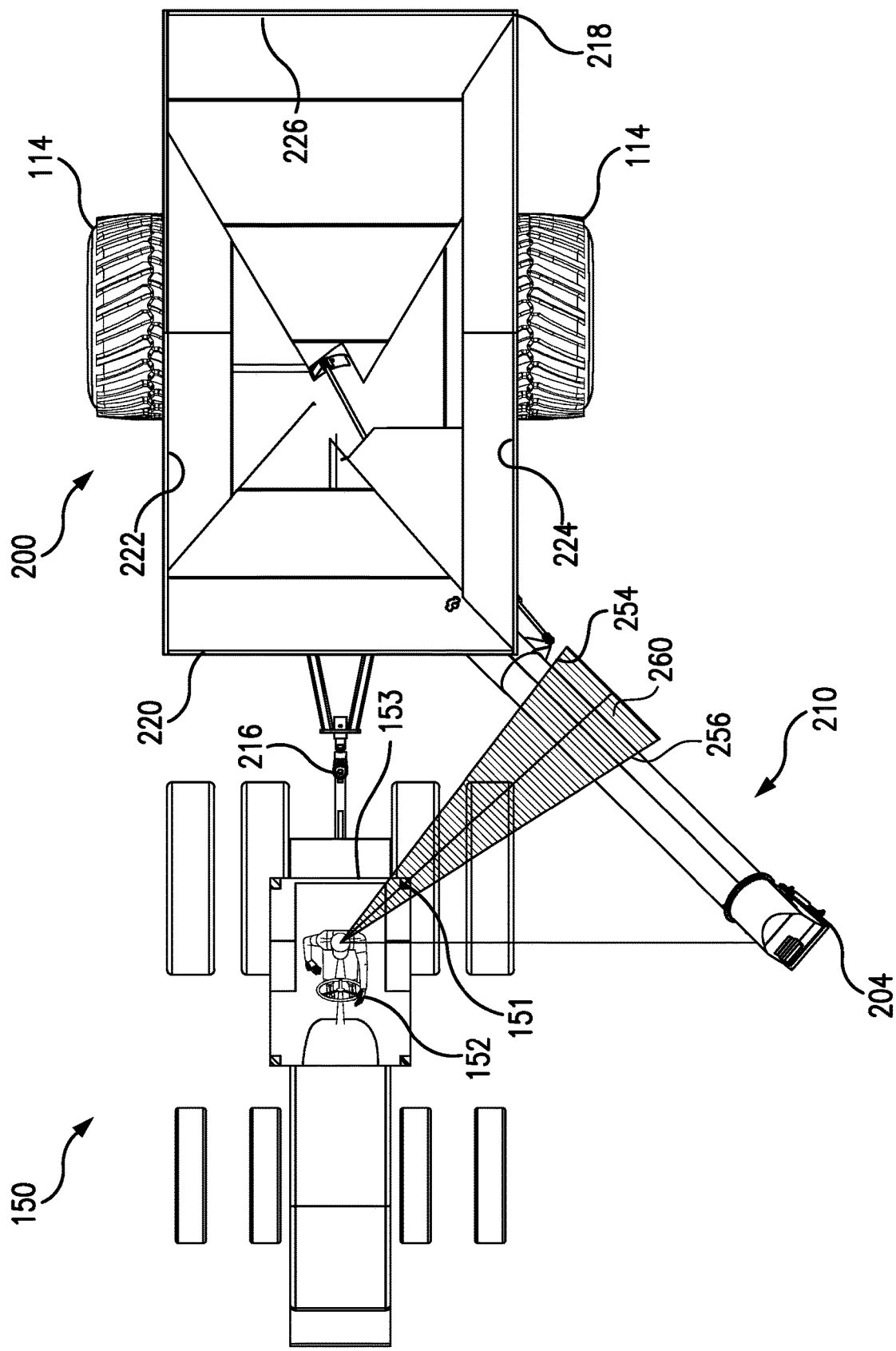
FIG. 2A depicts a top view of a grain cart according to exemplary embodiments of the present invention.
Figure 2B:
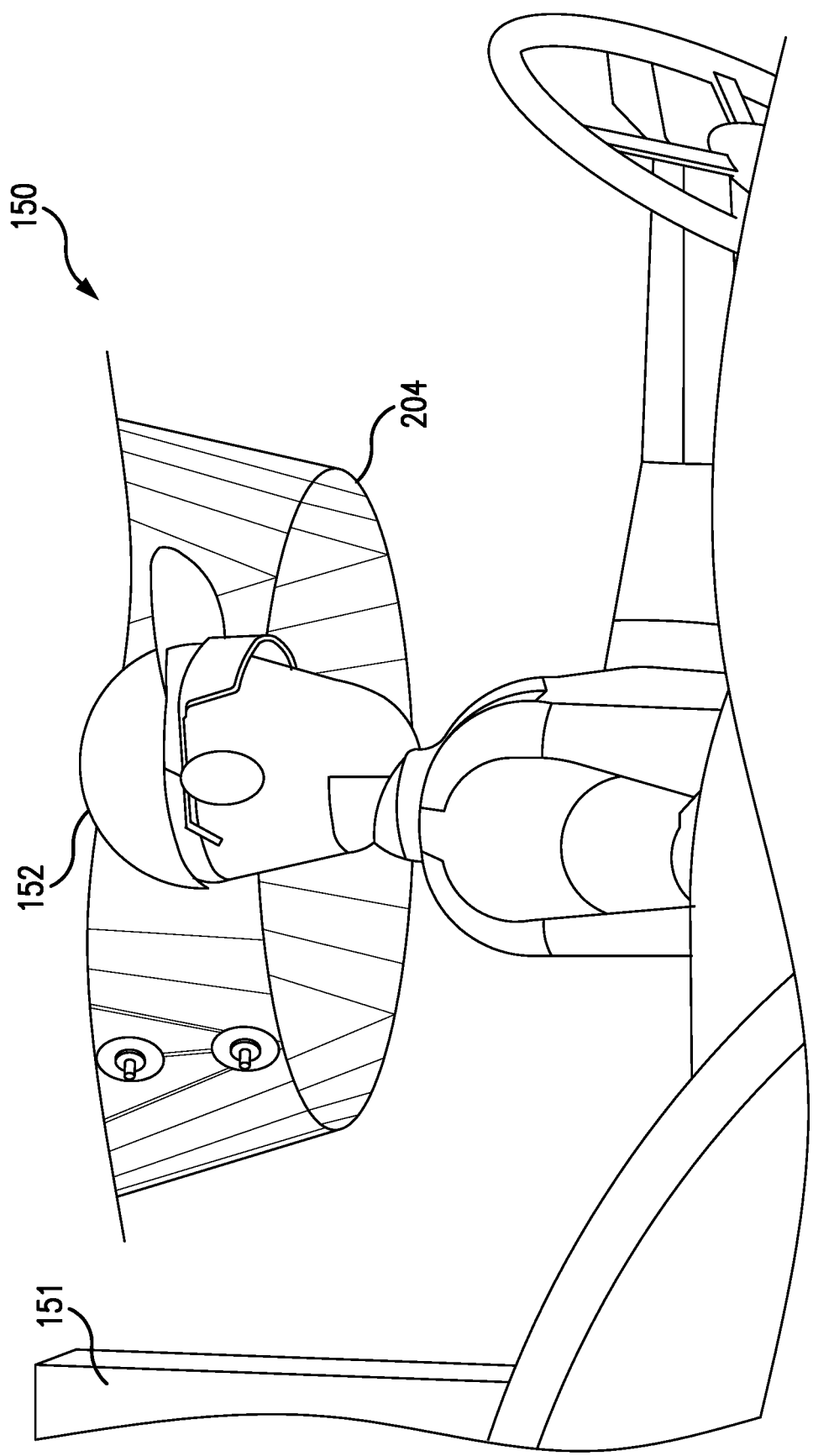
FIGS. 2B and 2C depict an orthogonal view from a tractor towing the grain cart of FIG. 2A.
Figure 2C:
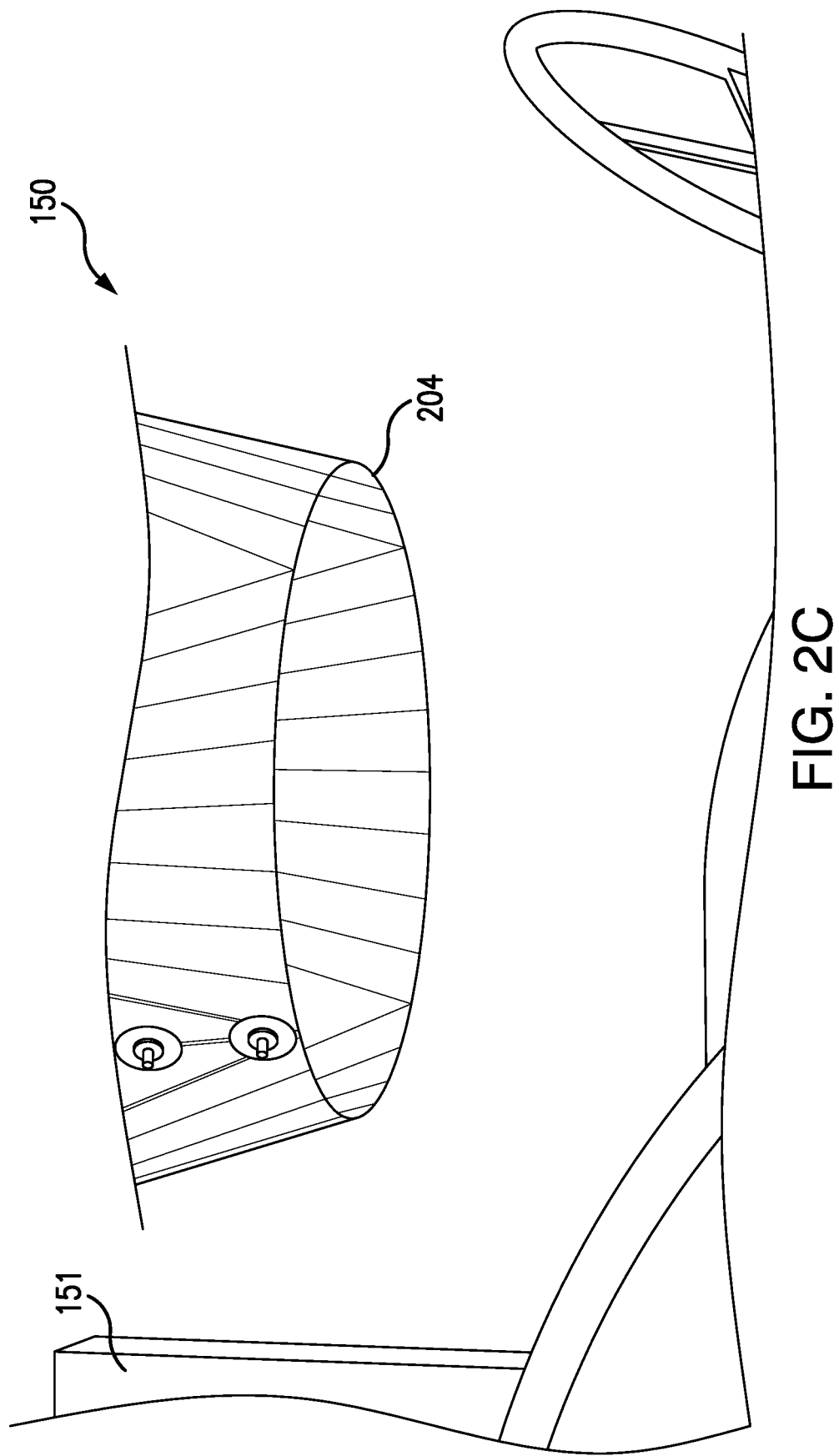

FIG. 2A is a top view of a grain cart 200 according to exemplary embodiments of the present invention. FIG. 2B is a rendered view from the perspective of an operator in a tractor towing the grain cart 200. FIG. 2C is a rendered view from the perspective of a tractor towing the grain cart 200 (without the operator). FIGS. 2A-C depict a grain cart 200 with a side-folding auger assembly 210 in an operating position. The grain cart 200 includes a grain holding container or hopper 218 mounted on a frame (shown, e.g., in FIG. 3) with wheels 114 and a hitch 216. The hopper 218 has a front wall or side 220, laterally opposed side walls 222 and 224, and a rear wall or side 226, which together define a grain holding space with an open top and a bottom. An intake or receiving portion 812 (shown in FIG. 8) of the auger assembly 210 forms a sump proximate the base or bottom of the hopper 218 to draw grain from the bottom of the hopper into the auger assembly 210. In some embodiments, the intake draws grain from the bottom of the hopper into the auger assembly 210 by gravity, while in other embodiments grain is fed into auger assembly 210 by another auger or conveyor. The auger assembly 210 extends upwardly from the intake 812 to a discharge portion 204 laterally and forwardly spaced from the hopper 218 to facilitate discharge of grain from the auger assembly into another container such as, for instance, another grain cart, semi-trailer, or rail car located to the side of the grain cart 200.

As shown in FIG. 2A, the grain cart 200 is being towed by tractor 150. Lines 254 and 256 emanate from operator 152 of the cab of the tractor 150. The shaded portion 260 between lines 254 and 256 illustrates the portion of the operator's view that is blocked by a vertical cab post 151. This is further illustrated in the rendered views of FIGS. 2B and 2C, which show the view from the tractor 150 during an unload operation, such as unloading the grain cart 200 into a storage container. As is clear from FIGS. 2A-C, the operator's view of the unload operation is significantly improved as compared to that shown in FIG. 1. This is because of the improved forward and side reach of auger assembly 210. In accordance with embodiments of the invention, the discharge portion 204 of the upper auger assembly extends in front of the back wall 153 of the tractor cab enabling the discharge portion of the upper auger assembly to be readily observable to the tractor operator in the operating position, as illustrated in FIGS. 2A-2C.

Figure 4:
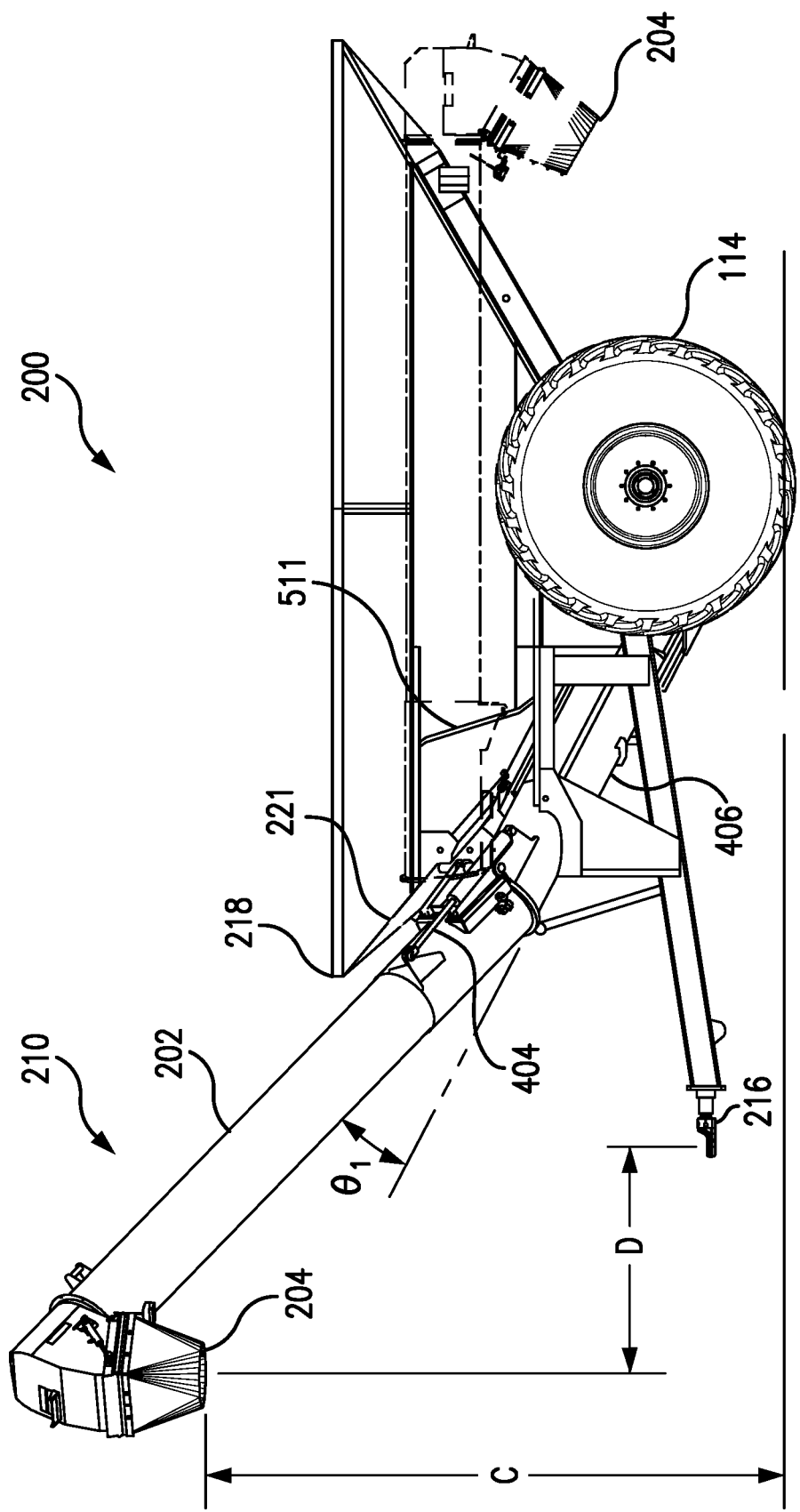
FIG. 4 depicts a side view of a grain cart according to exemplary embodiments of the present invention.

Auger assembly 210 includes an upper auger assembly portion 202 and a lower auger assembly portion 406 (shown in FIG. 4). The lower auger assembly portion 406 extends from intake portion 812 (shown in FIG. 8) near the bottom of hopper 218 to a front corner of the hopper where the one of the laterally opposed side walls 222 or 224 intersects front wall 220. In some embodiments, the lower auger assembly portion 406 extends from intake portion 812 to a point proximally adjacent to a front corner, immediately adjacent to a front corner, or disposed at or substantially at a front corner of the hopper. This is in contrast to the location of the auger assembly 110 in cart 100, which is disposed along a side wall of cart 100 and substantially away from the corner. The upper auger assembly portion 202 is connected to the lower auger assembly portion 406 by a joint assembly 508 (shown in FIGS. 5 and 9) that allows the upper auger assembly portion to be moved between an operating position extending laterally and forwardly outward from the front corner of the cart and a transport position folded across the side of the cart. In one embodiment, the joint assembly 508 is configured such that, in the operating position, the upper auger assembly portion 202 is angularly offset from the lower auger assembly portion 406 to the discharge portion 204 at an elevated position forwardly and to the side of the hopper 218. That is, a longitudinal axis of the upper auger assembly portion 202 may in one embodiment intersect a longitudinal axis of the lower auger assembly portion 406 at an angle $\theta_1$ (see FIG. 4). The discharge portion 204 has a rotatable opening or spout that can be positioned to discharge grain from the auger assembly 210 into another grain cart or the like located to the side of grain cart 200.

In the transport position (shown, e.g., in FIG. 5), the upper auger assembly portion 202 is folded at joint assembly 508 so that it extends rearwardly along a side of cart 200. In the transport position of this embodiment, the entire auger assembly 210 is disposed substantially within the external dimensional boundaries of the grain cart. In accordance with some embodiments, the upper auger assembly portion 202 may fit within the external dimensional boundaries of the grain cart, when in the transport position, or extend past it, e.g., past the rear of cart 200.

Figure 6:
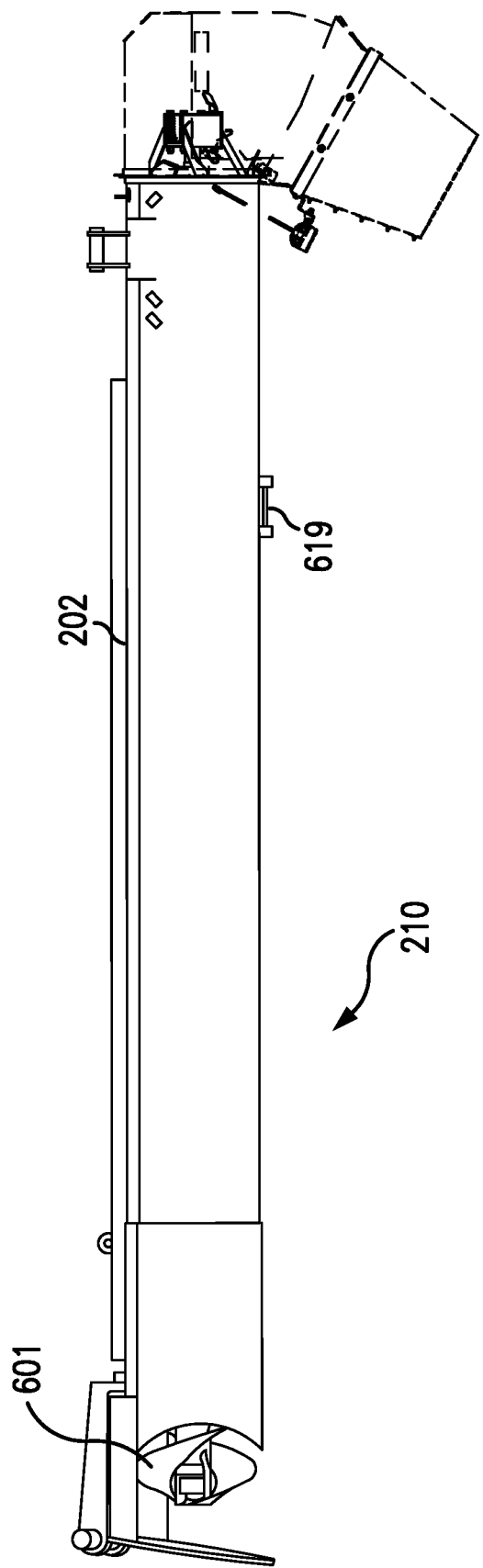
FIG. 6 depicts a view of the upper auger portion of a grain cart according to exemplary embodiments of the present invention.
Figure 7:
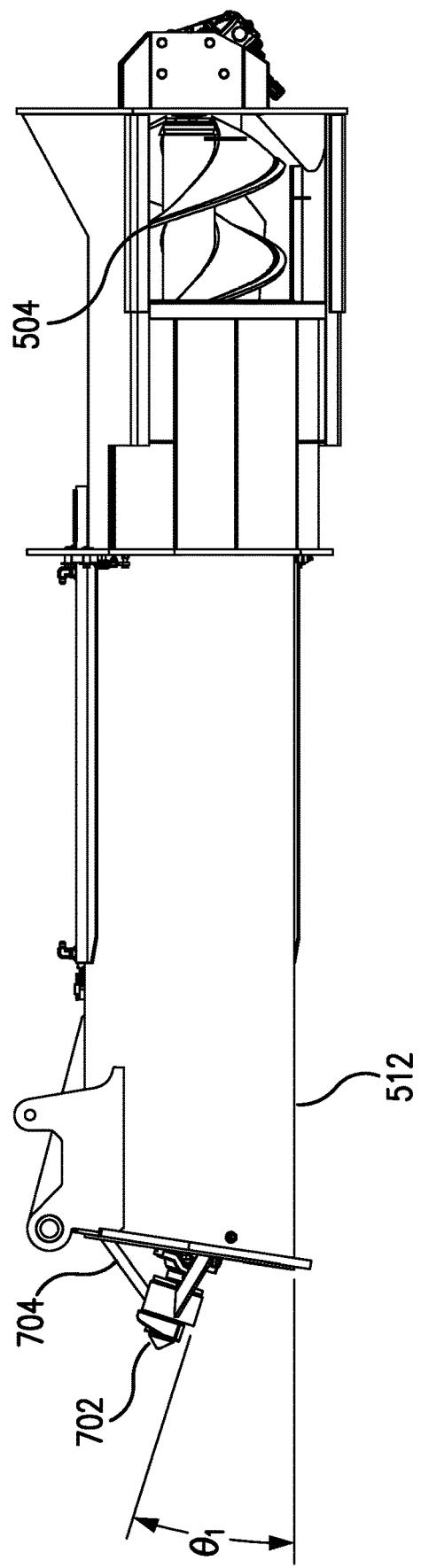
FIG. 7 depicts a view of the lower auger portion of a grain cart according to exemplary embodiments of the present invention.

Joint assembly 508 can affect a fold of auger assembly 210 according to an embodiment of the present invention. As can be seen (e.g., in FIGS. 5, 6 and 7) each of the upper auger assembly portion 202 and the lower auger assembly portion 406 includes an auger. The upper auger assembly portion 202 includes an upper auger 601 disposed within an upper tubular housing 510 and the lower auger assembly portion 406 includes a lower auger 504 disposed within a lower tubular housing 512. According to some embodiments of the present invention, the upper auger and lower auger have different diameters. For instance, the lower auger assembly might have a greater diameter than the upper auger assembly. According to other embodiments, the diameters can be the same or the upper auger assembly can have a greater diameter. Additionally, the pitch of the blades of the upper and lower augers can be different according to other embodiments of the invention.

Figure 9:
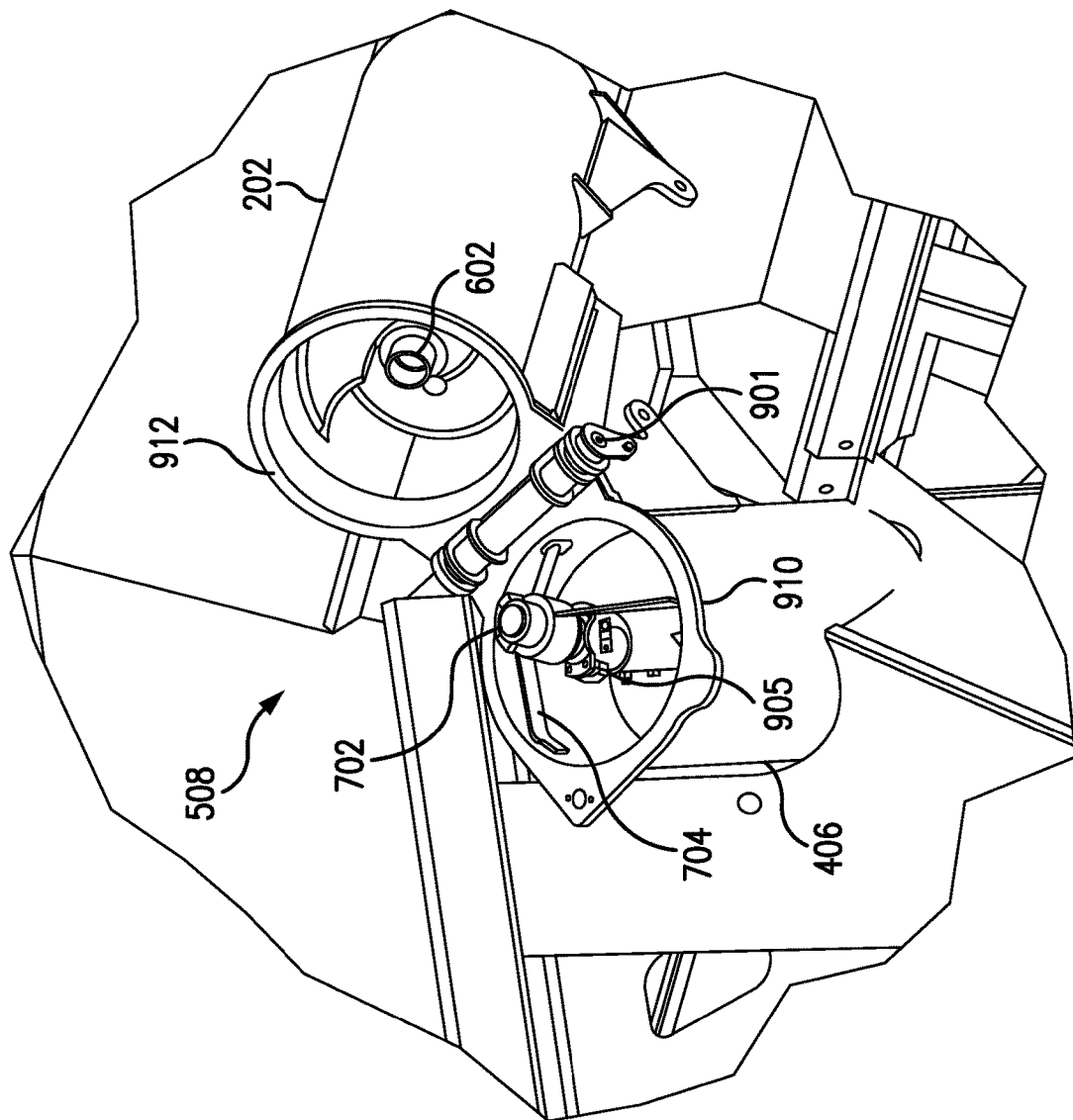
FIG. 9 depicts a joint assembly coupling the upper auger portion to the lower auger portion according to exemplary embodiments of the present invention.

In accordance with a non-limiting embodiment, joint assembly 508 coupling the upper auger portion to the lower auger portion with an angular offset (see FIG. 4) is further illustrated in FIG. 9. As shown in FIG. 9, joint assembly 508 may include hinge pin 901 having a pivot axis. The hinge pin 901 is oriented to cause the upper auger assembly portion 202 to fold in the manner described. In other words, the hinge pin 901 defines the pivot axis about which the upper auger assembly portion 202 can be folded. In some embodiments, the joint assembly 508 may also include flanges 910 and 912 and auger coupling portions 602 and 702 (see also FIGS. 6 and 7). In some embodiments, one or both of a plane formed by flange 910 and a plane formed by flange 912 may be skewed relative to the longitudinal axis of upper auger assembly portion 202 and lower auger assembly portion 406. Lower auger coupling portion 702 is connected to the lower auger 504 by a joint and is held in a desired orientation relative to lower housing 512 by a bearing hanger 704. Upper auger coupling portion 602 is in alignment with lower coupling portion 702 when upper and lower auger assembly portions are in the operational position shown in FIG. 4. According to some embodiments of the present invention, the joint 905 connecting auger coupling portion 702 to lower auger 504 is a universal joint (also known as a universal coupling, a U-joint, a Cardan joint, a Hardy-Spicer joint, or a Hooke's joint). However, any joint that allows the transfer of rotational motion through an angle would be acceptable. A hinge pin (e.g. hinge pin 901) can be oriented such that the upper auger portion 202 and the lower auger portion 406 can be rotated about one another in an operating state. In a non-limiting embodiment, when the flanged ends 910 and 912 abut one another, the upper and lower auger portions 202 and 406 are angled relative to each other and coupling portions 602 and 702 mate together to cause concurrent rotation of the upper and lower augers within their respective housings to draw grain from the container and discharge it into another container.

Figure 15A:
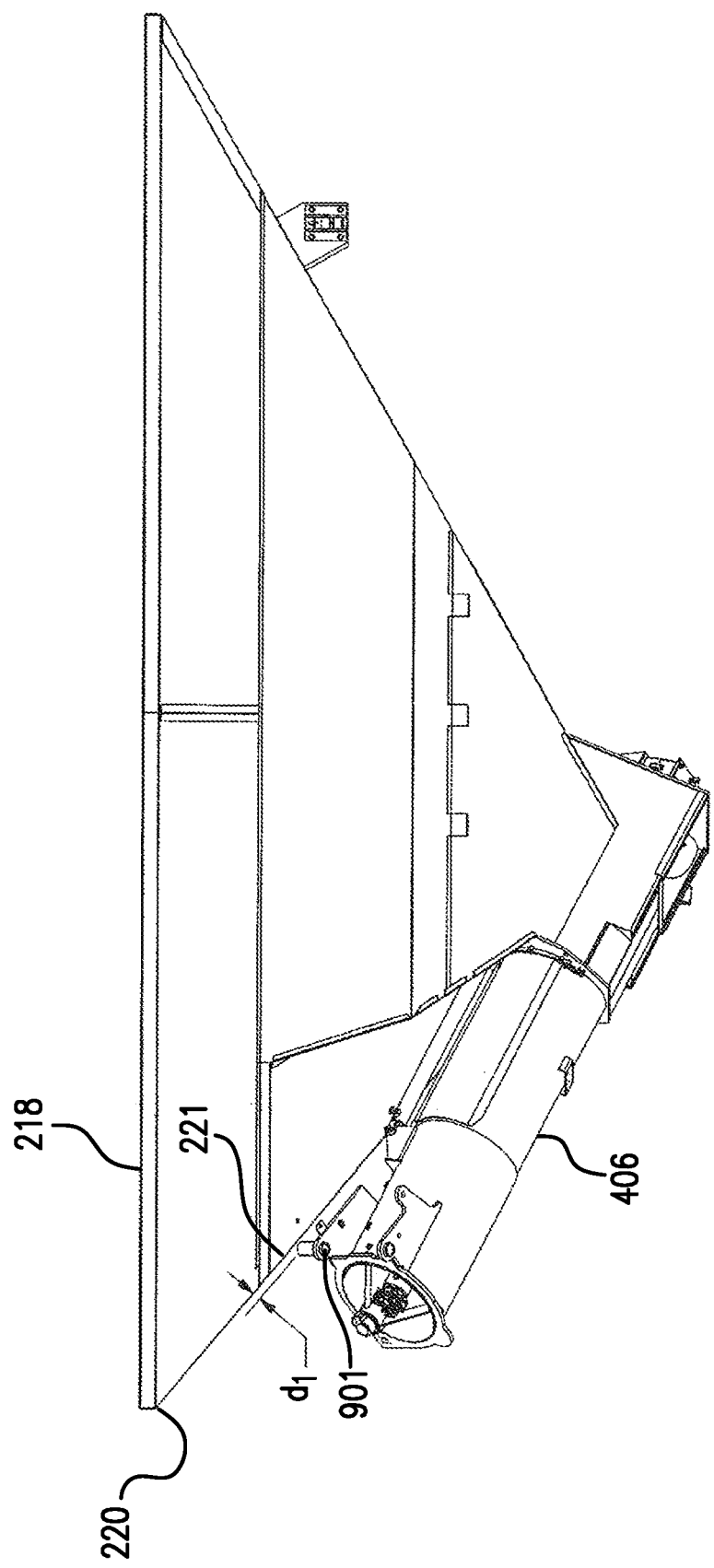
FIG. 15A depicts a side view of a grain cart according to embodiments of the present invention.
Figure 15B:
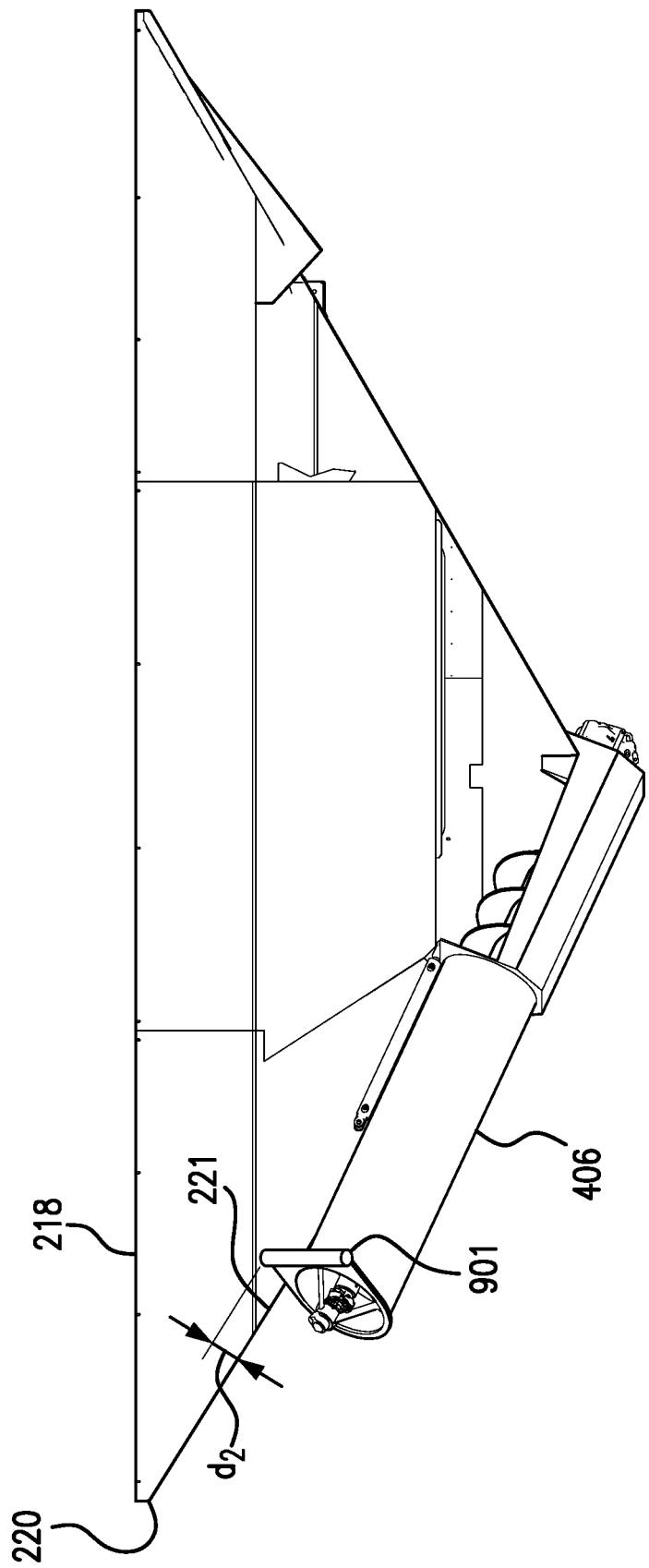
FIG. 15B depicts a side view of a grain cart according to embodiments of the present invention.

In accordance with some non-limiting embodiments, the hinge pin 901 may be located behind a front sloping portion 221 of front wall 220 of the hopper 218. In accordance with other non-limiting embodiments, the hinge pin 901, or at least a portion of the lower auger flange, may extend ahead of the front sloping portion 221 of front wall 220 of the hopper 218. For example, FIG. 15A illustrates a non-limiting embodiment where hinge pin 901 is in front of the front sloping portion 221 by a distance $d_1$ and FIG. 15B illustrates a non-limiting embodiment where hinge pin 901 is behind the front sloping portion 221 by a distance $d_2$.

According to some embodiments of the present invention, the upper auger assembly portion 202 is offset from the lower auger assembly portion 406 by an operating offset angle $\theta_1$ (shown in FIG. 4). That is to say that a line (i.e., a longitudinal axis) running through the center of the lower auger portion 406 would be offset by an operating offset angle $\theta_1$ from a line (i.e., a longitudinal axis) running through the center of the upper auger assembly portion 202.

As illustrated in FIG. 4, the offset angle increases side reach of the auger by positioning the upper auger assembly portion 202 laterally to the left. In certain embodiments, operating offset angle $\theta_1$ ranges from about greater than 0° to about 20°, or about 15° to 19°. In certain embodiments, operating offset angle $\theta_1$ is about 17.5°. In accordance with one non-limiting embodiment, an offset angle of about 17.5° can be utilized to provide desirable side reach and forward reach of the upper auger assembly portion 202. While the upper and lower auger assembly portions need not be co-linear, in other embodiments, the upper and lower auger assemblies are co-linear, and do not form an operating offset angle.

According to some embodiments of the present invention, the auger assembly 210 includes a control system 404 for controlling the folding and unfolding of the auger between the operating position and the transport position (see FIG. 4). According to embodiments of the invention, the control system can be a hydraulic system or an electronic motor. In certain embodiments, the control system can be controlled from a remote location such as from a tractor, which may be coupled or hitched to the grain cart.

In some embodiments, a protrusion or projection 619 (shown in FIG. 6) is optionally located on the upper portion of the auger assembly 210 between the folding joint and the discharge portion to engage a stop on the side of the cart in the transport position. In an embodiment, the projection includes a pin spaced from the auger housing and the stop defines a cradle that catches the pin to prevent further downward movement of the upper auger portion while also restraining inward movement thereof (i.e. toward the cart center) during transport. The location of the projection allows the upper auger assembly portion to be folded regardless of the rotational orientation of the discharge portion or spout.

In accordance with embodiments of the present invention, increased forward and side reach of the auger assembly can be achieved by a combination of one or more features. For example, positioning the lower auger assembly toward a corner closer to the front of the cart (as illustrated in FIG. 2A) allows the lower auger assembly length to be increased in comparison to the configuration of the lower auger assembly illustrated in FIG. 1. Increasing the lower auger assembly length and positioning it close to the front corner of the cart will result in greater forward reach of the auger assembly 210, even if using an upper auger assembly portion 202 having the same length as the upper auger assembly portion disclosed in FIG. 1.

Figure 5:
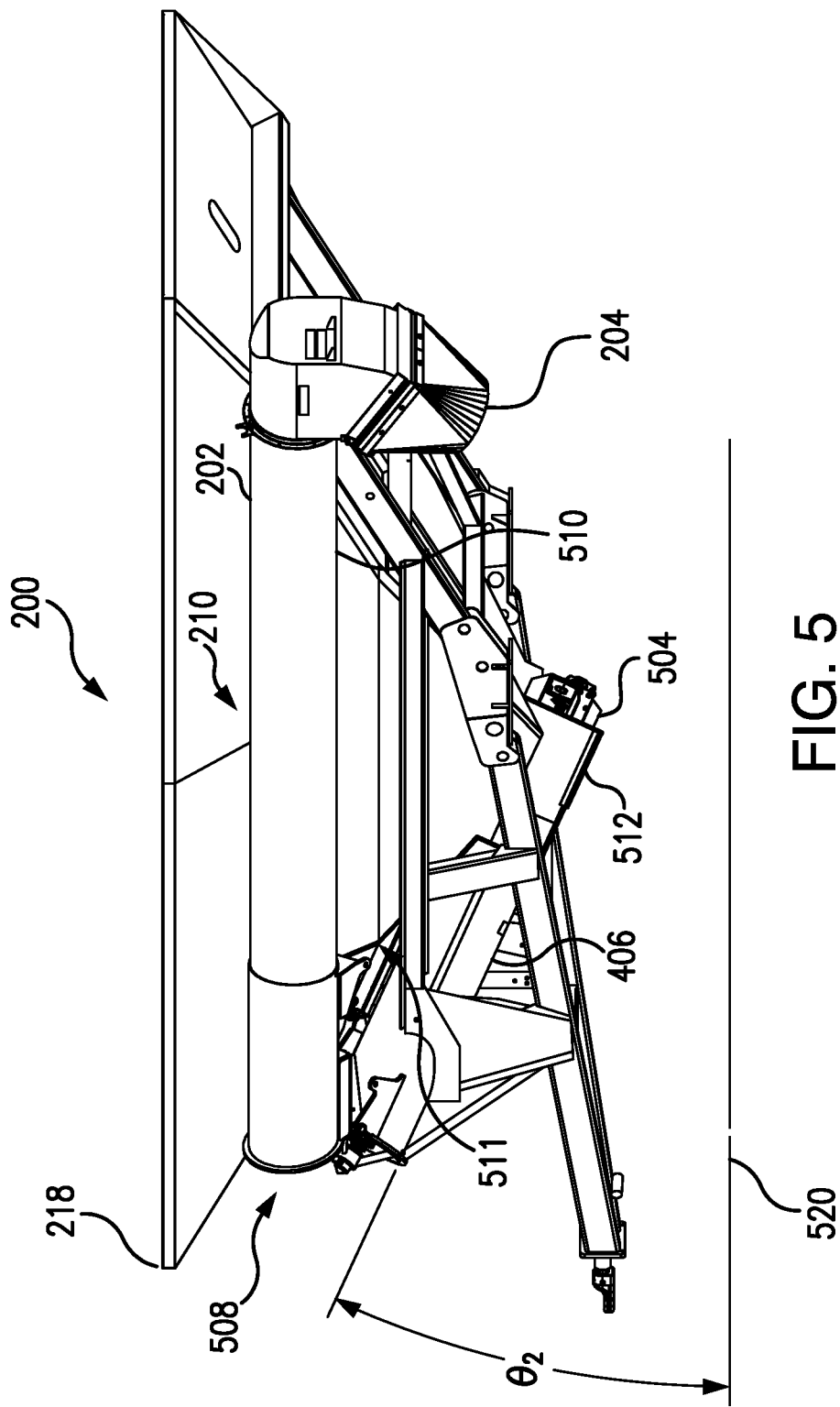
FIG. 5 depicts a perspective view of a grain cart according to exemplary embodiments of the present invention.

In accordance with some embodiments, increasing the forward reach of the upper auger assembly can be achieved by having the lower auger assembly portion make a shallower angle with the ground. For example, as illustrated in FIG. 5, the lower auger portion 406 forms an angle $\theta_2$ with the ground (e.g., horizontal reference plane 520). By making the angle $\theta_2$ smaller, the lower and upper auger assemblies will be lower to the ground thereby increasing the forward reach of the upper auger assembly. In some non-limiting embodiments (for example, those embodiments having the dogleg or positive operating offset angle $\theta_1$), the lower auger portion angle $\theta_2$ may be from 20° to 40°, and in certain embodiments from 22° to 26°, and in certain embodiments approximately 24°. In other non-limiting embodiments (for example, those embodiments without the dogleg, where the upper and lower auger assembly portions are collinear), the lower auger portion angle $\theta_2$ may be from 20° to 40°, and in certain embodiments from 30° to 36°, and in certain embodiments approximately 34°. In other non-limiting embodiments (for example, those embodiments without the dogleg where the upper and lower auger assembly portions are colinear), the lower auger portion angle $\theta_2$ may be from 20° to 40°, and in certain embodiments from 22° to 26°, and in certain embodiments approximately 24°. Thus, in accordance with some embodiments, a shallower angle (smaller $\theta_2$) will increase the forward reach of the upper auger assembly.

In accordance with some embodiments, as explained above, including a "dogleg" or operating offset angle (i.e. $\theta_1 > 0$) (as illustrated in FIG. 4), will improve the side reach of the auger assembly 210. For example, the larger the laterally offset angle is, the more the auger assembly will extend laterally, thereby increasing the side reach of the auger assembly 210.

In accordance with some embodiments, decreasing the hitch length may also improve the forward reach of the auger assembly 210. For example, the shorter the length of the hitch, for a fixed auger length, the more forward of the hitch the auger will be. This may also be explained by the operator in the cab of a tractor towing the grain cart being closer to the grain cart (due to the shorter hitch), and therefore having improved visibility of the discharge end of the auger assembly, to which the operator is now closer.

In addition to improvements to forward and side reach, in accordance with embodiments of the present invention improved auger performance (e.g., faster discharge rate) may be achieved by the shallower angle $\theta_2$ of the lower auger assembly portion. This improves the performance of the auger because each turn of the auger results in more grain in the flighting. In some embodiments, the joint assembly 508 can form a compound angle that provides both a lateral offset and an upward tilt of the upper auger assembly. See U.S. Pat. No. 9,039,340 incorporated herein by reference in its entirety. When such a compound angle joint is included, the angle the lower auger makes with the ground can be made even flatter.

Additionally, in accordance with embodiments of the present invention, greater capacity of the grain cart may be achieved. For example, in embodiments where the lower auger portion forms a shallower angle with the ground, and because the lower auger portion is moved closer to the corner of the grain cart, the angle of the lower wall 511 of the grain cart (see FIG. 5) can be made shallower, thereby increasing hopper capacity for a given width and length.

Figure 3:
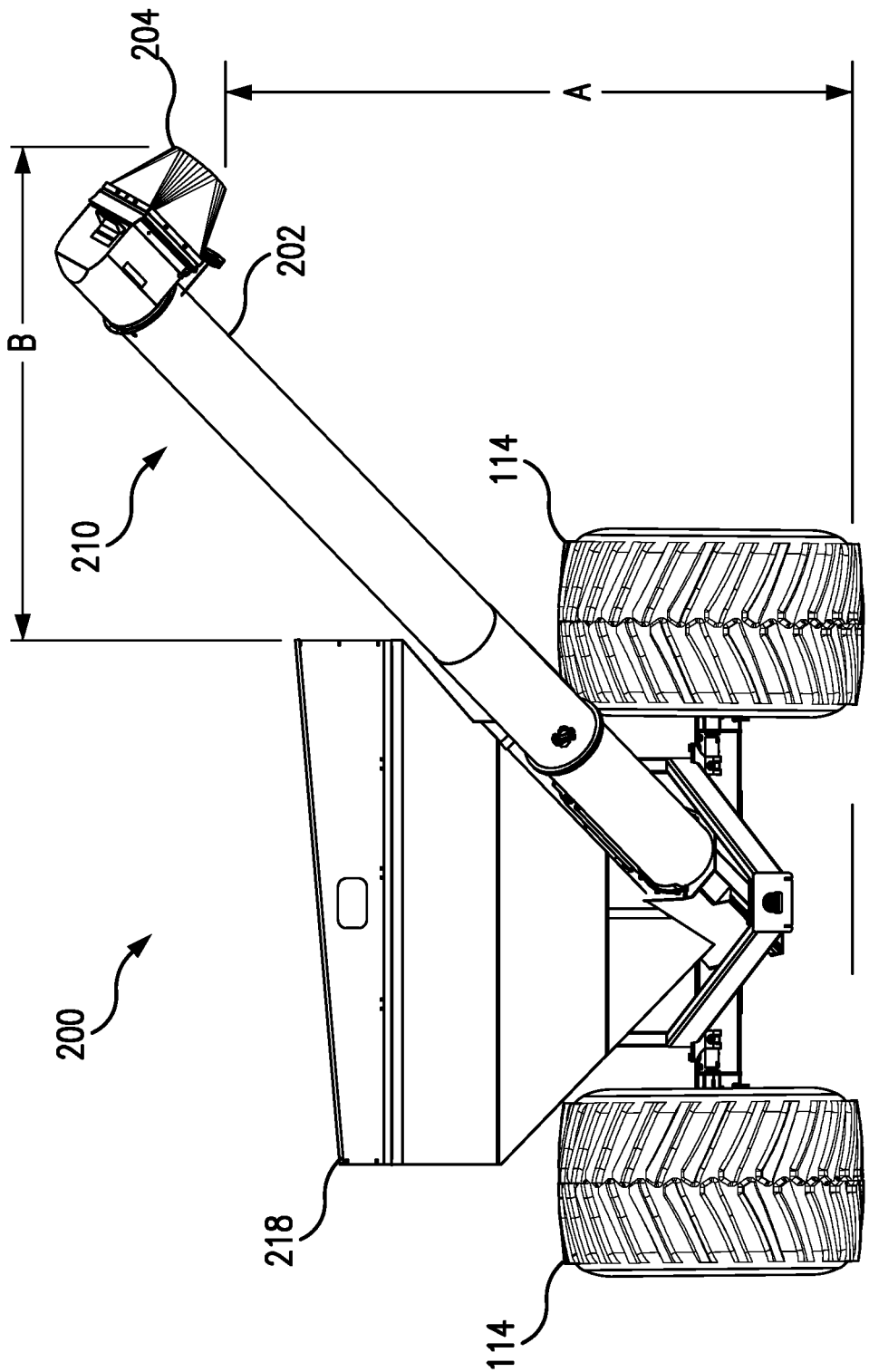
FIG. 3 depicts a front view of a grain cart according to exemplary embodiments of the present invention.

As illustrated in FIG. 3, auger assembly 210 has a side reach B which is a distance that the discharge end or portion 204 of auger assembly 210 extends laterally from a side of the cart 200. Auger assembly 210 also has a height A which is a vertical distance from the ground or bottom of the wheels 114 to the discharge end or portion 204 of auger assembly 210. Because discharge portion 204 may in some embodiments change position (e.g., to facilitate in the unloading process, the discharge portion 204 may rotate or swivel from side to side), the measurements of the height A or side reach B may depend on the position of the discharge portion 204. The values for side reach or height may also be dependent on the capacity of the grain cart. In some embodiments of the present invention, for example for a grain cart having approximately 1000 or 1100 bushels, the side reach B may be from 125 inches to 145 inches, and in certain embodiments from 130 inches to 140 inches, and in certain embodiments approximately 133 inches. In other embodiments of the present invention, for example a grain cart having approximately 1300 or 1500 bushels, the side reach B may be from 120 to 140 inches. In some embodiments of the present invention, for example for a grain cart having a capacity of approximately 1000 or 1100 bushels, the height A from the ground to the discharge portion 204 is from 165 inches to 175 inches, and in certain embodiments from 168 inches to 172 inches, and in certain embodiments approximately 169 inches.

As illustrated in FIG. 4, auger assembly 210 has a height C which is a vertical distance from the ground or bottom of the wheels 114 to the discharge end or portion 204 of auger assembly 210. As shown in FIG. 4, the auger discharge portion 204 is oriented downward. The auger assembly 210 also has a horizontal distance D between the hitch 216 and the auger discharge portion 204. As shown, D is the distance that the auger discharge portion 204 (when in the operating position) is forward of the hitch. In prior art carts, such as in cart 100, the auger discharge portion 104 may be located behind the hitch and not forward of it. In some non-limiting embodiments, for example for a grain cart having a capacity of approximately 1000 or 1100 bushels, the distance D that the discharge portion is forward of the hitch when in the operating position may be from 40 inches to 100 inches, and in certain embodiments from 55 inches to 70 inches, and in certain embodiments approximately 60 inches.

As illustrated in FIGS. 8 and 8A, lower auger portion 406 has a length I. Length G is a length from the pivot point determining the fold axis to the base plate of the auger. Length H is a length of the flow door opening where agricultural material can enter into the auger from the hopper. Length I is a distance from one end of the auger to the other, as shown in FIG. 8A. In some non-limiting embodiments, for example for a grain cart having a capacity of approximately 1000 or 1100 bushels, the length of the lower auger portion I is from 90 inches to 125 inches, and in certain embodiments from 100 inches to 120 inches, and in certain embodiments approximately 107 inches. The pivot to base plate length G (in these non-limiting embodiments) is from 90 inches to 160 inches, and in certain embodiments from 100 inches to 150 inches, and in certain embodiments approximately 107 inches. The flow door opening length H (in these non-limiting embodiments) is from 30 inches to 40 inches, and in certain embodiments from 34 inches to 38 inches, and in certain embodiments approximately 36 inches. Cart 100 may have a lower auger portion with an auger length of approximately 81 inches, a length from the pivot point to the base plate of approximately 87 inches, and a flow door opening length of approximately 36 inches. In other embodiments of the present invention, for example for a grain cart having a capacity of approximately 1300 or 1500 bushels, the length lower auger portion I is from 125 inches to 140 inches. As explained above, by moving the position of where the auger assembly extends from the grain cart closer to the corner, the length of the lower auger portion is thereby allowed to be increased over related art grain carts and thereby increasing forward reach.

Figure 16:
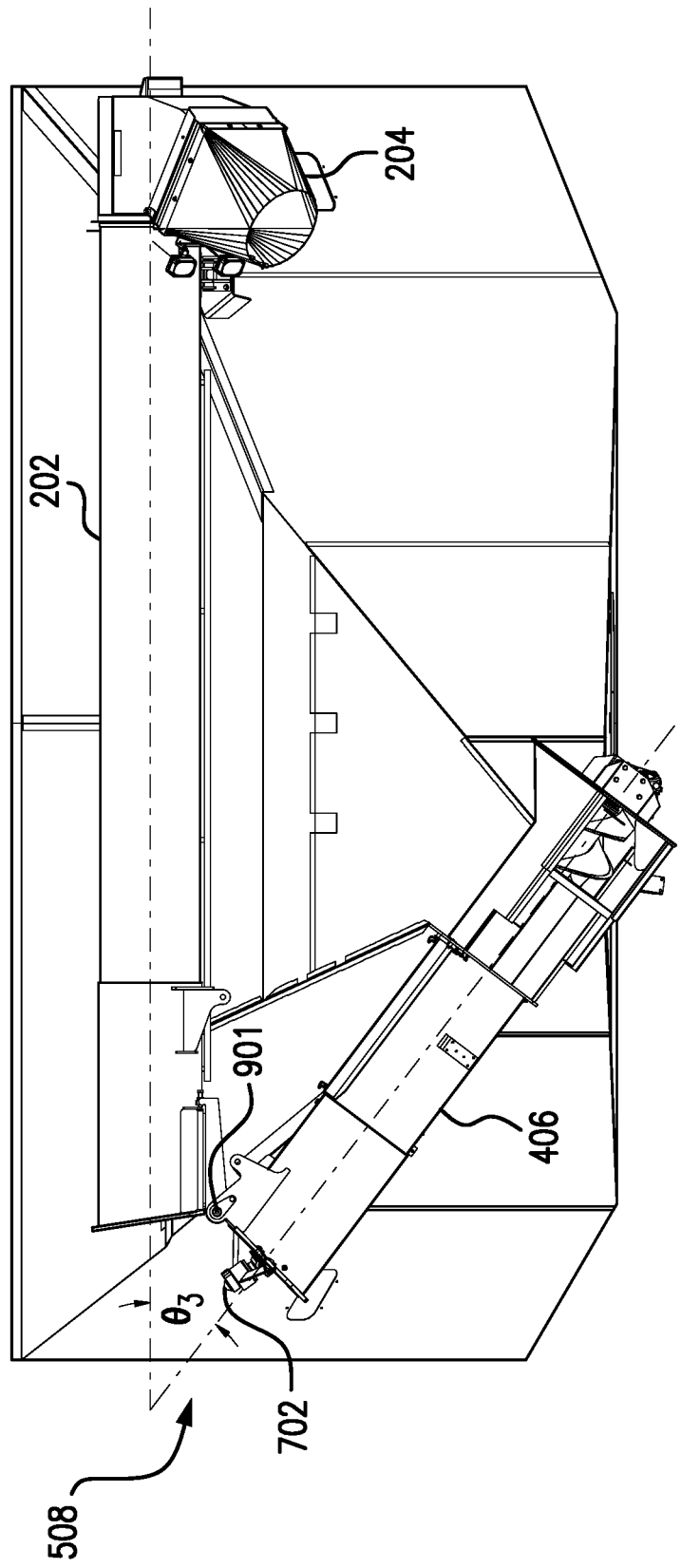
FIG. 16 depicts a view of a grain cart through the centerline of the hinge pin according to embodiments of the present invention.

In some embodiments, an angle $\theta_3$ is formed (as shown in FIG. 16) when the auger assembly is in the transport position. FIG. 16 shows a view looking at the centerline of hinge pin 901. From this view, angle $\theta_3$ is defined as the angle formed by longitudinal axes of upper auger assembly portion 202 and lower auger assembly portion 406 when the auger assembly is in the transport position. In some non-limiting embodiments, angle $\theta_3$ may be from 25° to 55°, in other embodiments angle $\theta_3$ may be from 30° to 40°, and in other embodiments angle $\theta_3$ may be approximately 37°.

Additionally, it will be appreciated that locating the auger assembly closer to a corner of the cart, and making the angle of the lower auger portion with respect to the ground shallower, allows for a greater capacity in the hopper and can improve the discharge rate of the auger.

In accordance with some non-limiting embodiments, the forward hitch reach, which is the distance D that the auger discharge portion is forward of the hitch when in the operating position, is at least 45% of the side reach B. In other embodiments, the forward hitch reach is at least 50% or at least 55% or at least 60% of the side reach.

Differences between embodiments of the present invention and existing side-folding grain carts, including the greater forward and side reach capabilities of embodiments of the present invention, are illustrated by the following comparisons. As described above, FIG. 1 depicts an operator's view from an existing side-folding grain cart, and FIGS. 2A-C depict an operator's view from a grain cart according to a non-limiting embodiment of the present invention.

In accordance with one non-limiting embodiment for a grain cart having a capacity of approximately 1000 bushels, the distance D that the discharge portion is forward of the hitch may be approximately 60 inches. In comparison, a 1000 bushel Brent 1082 side-fold related art grain cart has the discharge portion behind the hitch by approximately 47 inches in the operating position. Thus, in accordance with some embodiments of the present invention, the distance that the discharge portion of the upper auger portion is more forward in comparison to the Brent 1082 related art grain cart by approximately 107 inches.

In accordance with the non-limiting embodiment above for a grain cart having a capacity of approximately 1000 bushels, the lower auger angle $\theta_2$ is approximately 25°. In comparison, a 1000 bushel Brent 1082 side-fold related art grain cart has a lower auger angle of approximately 39°. Thus, in accordance with some embodiments of the present invention, the lower auger angle $\theta_2$ is approximately 37% shallower compared to related art grain carts.

In accordance with the non-limiting embodiment above for a grain cart having a capacity of approximately 1000 bushels, the lower auger portion has a lower auger length I of approximately 107 inches. In comparison, a 1000 bushel Brent 1082 side-fold related art grain cart has a lower auger length of approximately 81 inches. Thus, in accordance with some embodiments of the present invention, the lower auger length may be approximately 32% longer compared to related art grain carts.

In some embodiments, the length of the hitch can also be made shorter than conventionally used in grain carts. For example, in one embodiment, the hitch length can be as much as one foot less than in related art grain carts such as cart 100. The hitch or tongue must be long enough to keep the auger from hitting the tractor. However, shortening the length can increase the forward reach of the auger and the visibility by the tractor operator during an unload operation.

Figure 10:
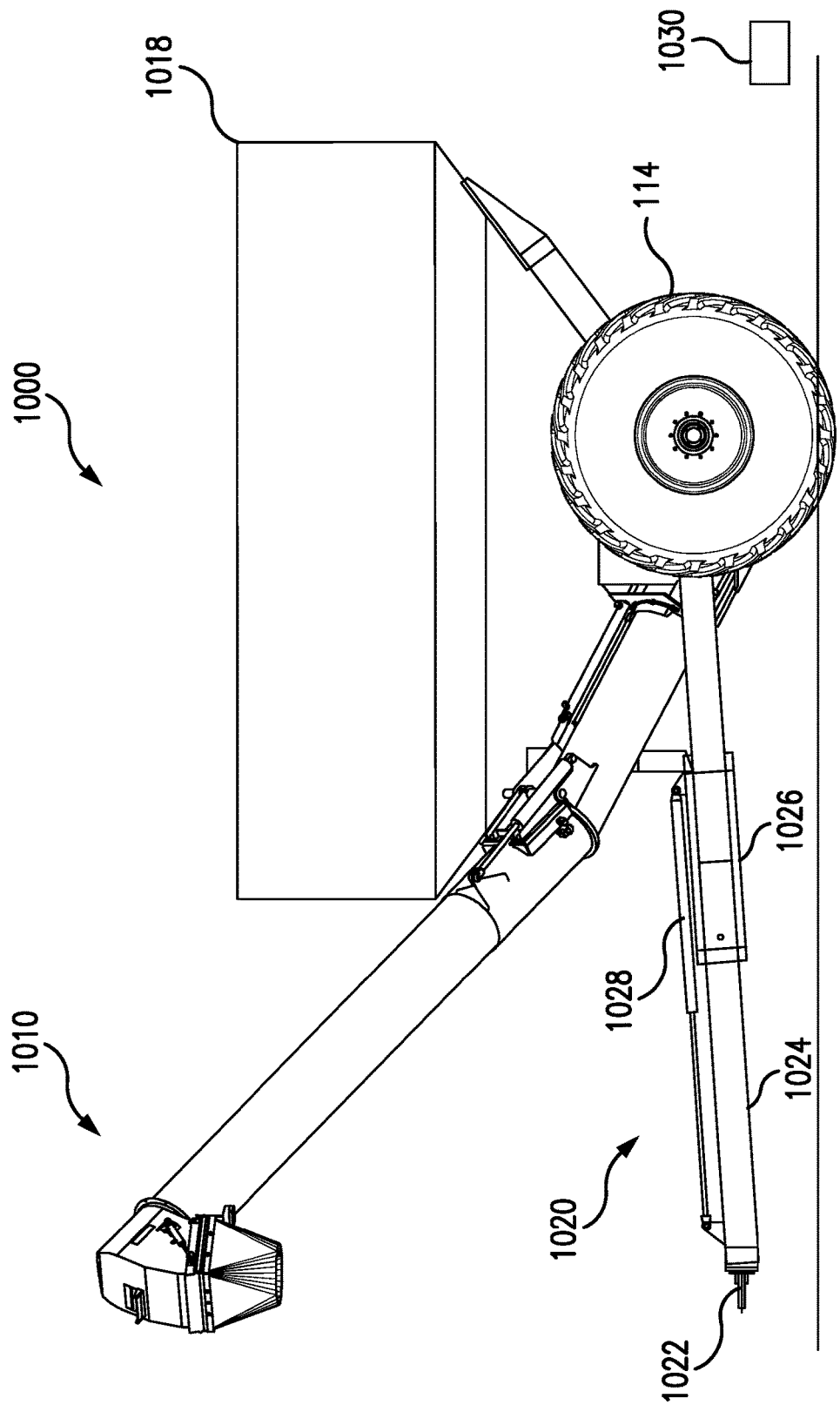
FIG. 10 depicts a side view of a grain cart according to embodiments of the present invention.
Figure 11:
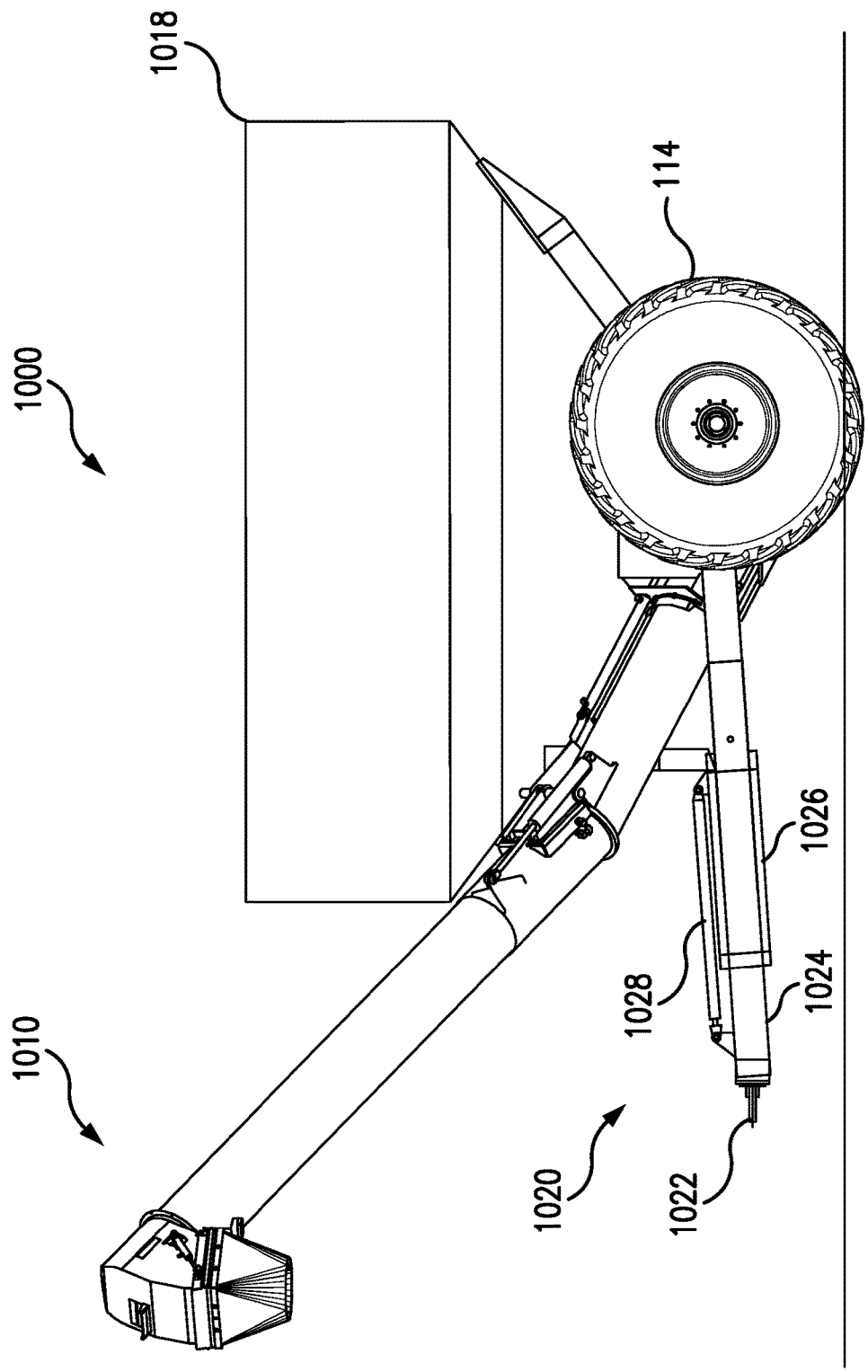
FIG. 11 depicts a side view of a grain cart according to embodiments of the present invention.
Figure 12:
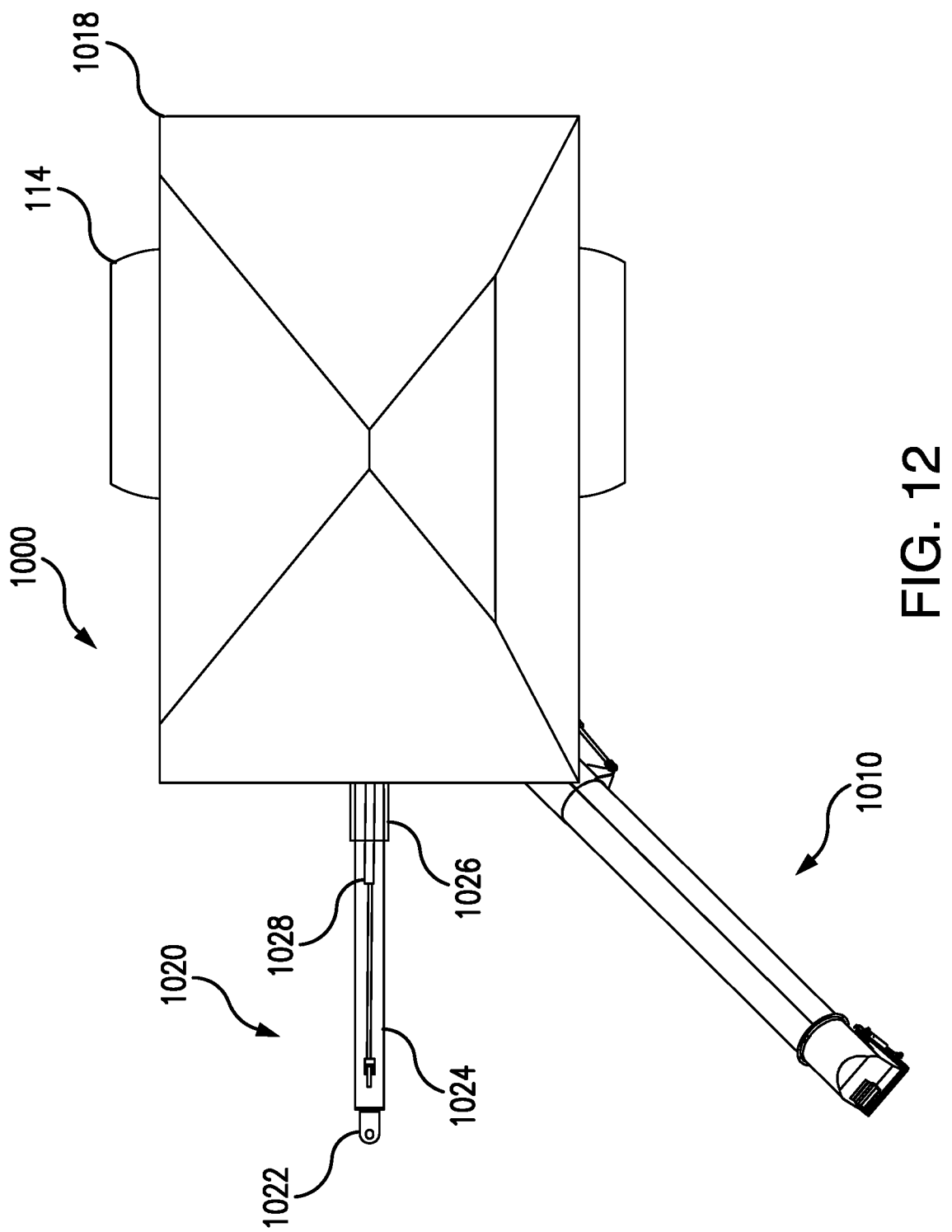
FIG. 12 depicts a top view of a grain cart according to embodiments of the present invention.
Figure 13:
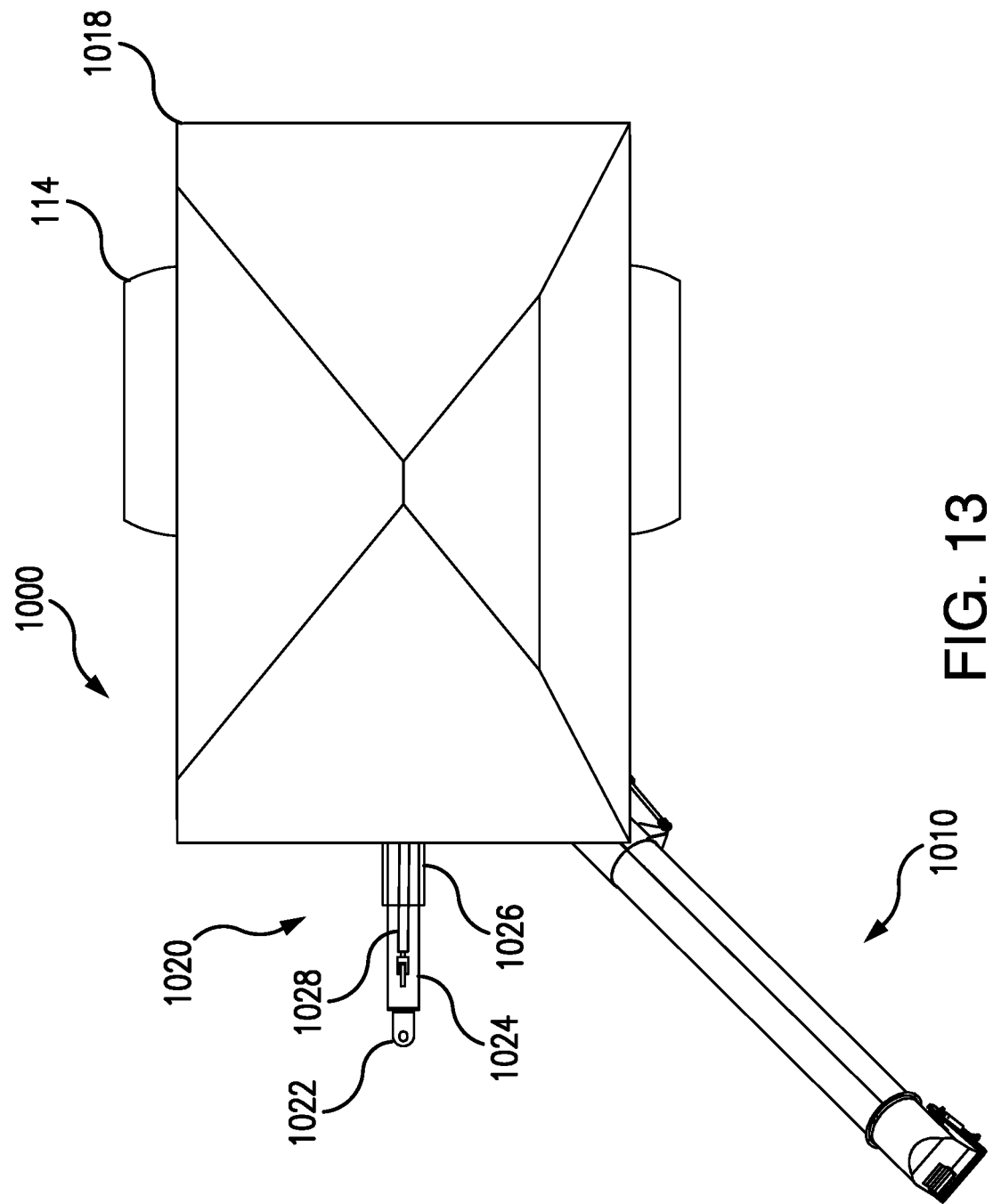
FIG. 13 depicts a top view of a grain cart according to embodiments of the present invention.
Figure 14:
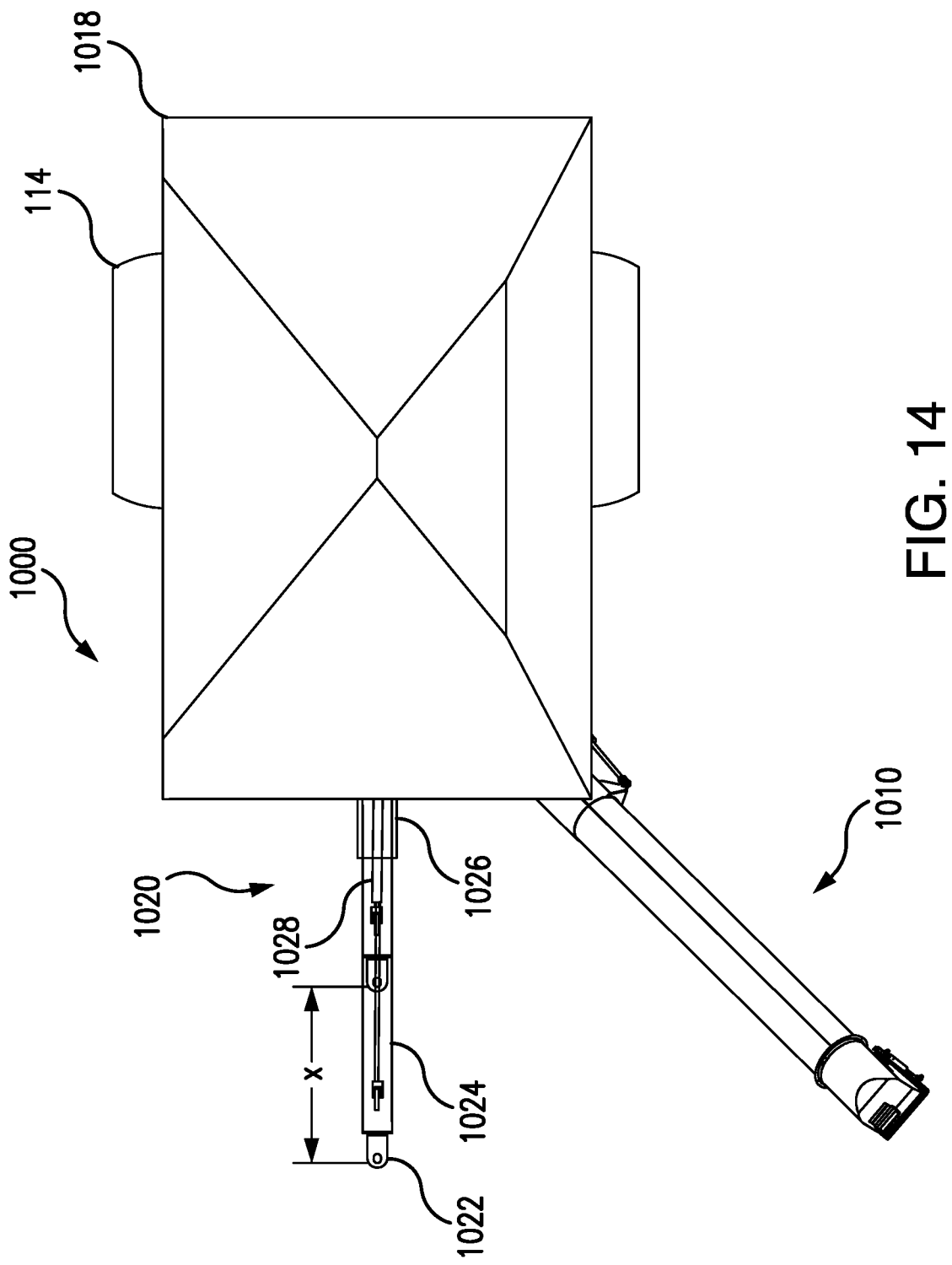
FIG. 14 depicts a top view of a grain cart according to embodiments of the present invention.

FIGS. 10-14 depict an embodiment of the present invention including a telescoping tongue. Cart 1000 includes a hopper 1018, wheels 114, an auger assembly 1010, and a hitch assembly 1020. Hitch assembly 1020 includes a hitch 1022 coupled to inner tongue portion 1024 and outer tongue portion 1026. Inner tongue portion 1024 is operable to move in or out of outer tongue portion 1026 by operation of telescoping actuator 1028, thereby causing the length of the hitch assembly 1020 to change. Telescoping actuator 1028, in some non-limiting embodiments, may be a hydraulic cylinder. In accordance with some embodiments, FIGS. 10 and 12 show hitch assembly 1020 in an extended position, FIGS. 11 and 13 show hitch assembly 1020 in a retracted position, and FIG. 14 shows hitch assembly 1020 in an intermediate position. In some embodiments, the difference in length of hitch assembly 1020 between the extended and retracted positions is from about 6 inches to about 2 feet, or in certain embodiments from about 8 inches to about 16 inches, or in certain embodiments about 1 foot. In accordance with other embodiments, hitch assembly 1020 may have more or fewer positions than this. In accordance with some embodiments, hitch assembly 1020 of grain cart 1000 may be employed on any other grain cart herein disclosed, including grain cart 200.

In accordance with some embodiments, by decreasing the length of the hitch assembly, the discharge end of auger assembly 1010 is moved forward relative to the hitch assembly, which may make it easier for an operator to view the auger assembly during discharge. The control of the telescoping actuator 1028 can be done manually in some embodiments. The control of the telescoping actuator 1028 could also be completely or partially automatic, for example by controller 1030. For example, in some embodiments, a controller may be configured to cause the telescoping actuator 1028 to adjust hitch assembly 1020 to its retracted position, decreasing the length of the hitch assembly 1020, in response to, for example, the power take off (PTO), driveshaft, or auger beginning to rotate. In accordance with some embodiments, a controller may be configured to cause the telescoping actuator 1028 to adjust hitch assembly 1020 to its extended position, increasing the length of the hitch assembly 1020, in response to the unloading process being complete. Increasing the length of hitch assembly 1020 when the unloading process is complete, for example, can lead to increased turning clearance. This extending movement could be done when the rotation of the PTO, driveshaft of auger is zero. Control of the telescoping actuator 1028 could also be based on the upper auger position. For instance, the telescoping actuator can be controlled to adjust the hitch assembly to the retracted position in response to the discharge auger being in the unloading position and the telescoping actuator can be controlled to adjust the hitch assembly to the extended position in response to the auger being moved to the transport position. Controller 1030 may, in some embodiments, be located on the grain cart or located on the tractor or located remotely, such as on a handheld device. Controller 1030 may, in some embodiments, be configured to control telescoping actuator 1028 or hitch assembly 1020 by a wired connection or a wireless connection to telescoping actuator 1028 or hitch assembly 1020. In accordance with some embodiments, controller 1030 may use a sensor for detecting rotation of the PTO, driveshaft or auger, or position of the upper auger.

In some embodiments, a first telescoping drive assembly may be provided to transmit torque from the tractor PTO to the auger and a second telescoping drive assembly may be provided between the grain cart hitch and the auger.

Thus, a number of embodiments have been fully described above with reference to the drawing figures. Other details of the embodiments of the invention should be readily apparent to one skilled in the art from the drawings. Although the invention has been described based upon these embodiments, it would be apparent to those skilled in the art that certain modifications, variations, and alternative constructions would be apparent, while remaining within the spirit and scope of the invention. For example, a gear box with a pair of beveled gears or a double U-joint could be used as a coupling for the upper and lower auger portions instead of a single U-joint. Furthermore, if desired, the lower auger portion can be a turbo auger as disclosed in U.S. patent application Ser. No. 12/192,821, titled "Improved Auger for a Grain Cart," filed on Aug. 16, 2007, the entire contents of which are incorporated herein by reference. Additionally, while the grain cart has been shown and described with two wheels on a single axle, it will be appreciated by those skilled in the art that the folding auger of the present invention can be utilized in a cart having walking-tandem dual wheels, steerable tandem axles and other wheel arrangements. These and other modifications of the present invention are intended to be within the scope of the appended claims.

What is claimed is:

1. A grain cart comprising:
   a wheeled frame;
   a container mounted on said frame and configured to hold a quantity of grain, said container having front, rear and laterally opposed side walls;
   a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing,
   wherein said first end of said lower auger housing has an intake opening proximate a bottom of said container to receive grain and said second end of said lower auger housing is disposed substantially at a front corner of said container where one of said laterally opposed side walls intersects the front wall of the container;
   wherein said first end of said upper auger housing is disposed adjacent said second end of said lower auger housing and said second end of said upper auger housing has a discharge portion to discharge grain from said container,
   wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along said one of said laterally opposed side walls defining said front corner to facilitate transporting said grain cart;
   wherein a longitudinal axis of said lower auger assembly portion extends upwardly, forwardly, and laterally outward relative to said front corner of said container when in said operating position and wherein a longitudinal axis of said upper auger assembly portion extends upwardly, forwardly, and laterally outward relative to said front corner of said container when in said operating position;
   wherein said upper auger assembly portion includes a first auger coupling portion and said lower auger assembly portion includes a second auger coupling portion, and wherein at least one of said first and second auger coupling portions is connected to a joint that allows the transfer of rotational motion;
   wherein said first auger coupling portion is configured to releasably engage with said second auger coupling portion in said operating position, and said first auger coupling portion is configured to be disengaged from said second auger coupling portion;
   wherein said grain cart further comprises a hitch for allowing said grain cart to be towed, and wherein said discharge portion is forward of said hitch when in said operating position, and
   wherein said discharge portion is forward of said hitch when in said operating position by a first distance greater than or equal to 60 inches and wherein the first distance is at least 45% of a second distance that said discharge portion extends outward from said one of said laterally opposed side walls.

2. The grain cart of claim 1, wherein the first distance is greater than 70 inches.

3. The grain cart of claim 1, wherein the first distance is from 60 inches to 100 inches.

4. The grain cart of claim 1, wherein the first distance is from 70 inches to 100 inches.

5. The grain cart of claim 1, wherein the first distance is at least 50% of the second distance.

6. The grain cart of claim 1, wherein the first distance is at least 55% of the second distance.

7. The grain cart of claim 1, wherein the first distance is at least 60% of the second distance.

8. A grain cart comprising:
   a wheeled frame;
   a container mounted on said frame and configured to hold a quantity of grain, said container having front, rear and laterally opposed side walls;
   a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing;
   wherein said first end of said lower auger housing has an intake opening proximate a bottom of said container to receive grain and said second end of said lower auger housing is disposed substantially at a front corner of said container where one of said laterally opposed side walls intersects the front wall of the container;
   wherein said first end of said upper auger housing is disposed adjacent said second end of said lower auger housing and said second end of said upper auger housing bas a discharge portion to discharge grain from said container;
   wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along said one of said laterally opposed side walls defining said front corner to facilitate transporting said grain cart;

wherein a longitudinal axis of said lower auger assembly portion extends upwardly, forwardly, and laterally outward relative to said front corner of said container when in said operating position and wherein a longitudinal axis of said upper auger assembly portion extends upwardly, forwardly, and laterally outward relative to said front corner of said container when in said operating position, wherein said upper auger assembly portion includes a first auger coupling portion and said lower auger assembly portion includes a second auger coupling portion, and wherein at least one of said first and second auger coupling portions is connected to a joint that allows the transfer of rotational motion;

wherein said first auger coupling portion is configured to releasably engage with said second auger coupling portion in said operating position, and said first auger coupling portion is configured to be disengaged from said second auger coupling portion;

wherein said grain cart further comprises a hitch for allowing said grain cart to be towed, and wherein said discharge portion is forward of said hitch when in said operating position, wherein said discharge portion is forward of said hitch when in said operating position by a first distance greater than or equal to 60 inches;

wherein the lower auger portion forms an angle with a horizontal reference plane, such that the angle is less than 40°.

9. The grain cart of claim 8, wherein the angle is less than 26°.

10. The grain cart of claim 8, wherein the angle is less than 22°.

11. The grain cart of claim 8, wherein the angle is between 20° and 40°.

12. The grain cart of claim 8, wherein the angle is between 22° and 26°.

13. The grain cart of claim 8, wherein the angle is between 30° and 36°.

14. A grain cart comprising:
a wheeled frame;
a container mounted on said frame and configured to hold a quantity of grain, said container having front, rear and laterally opposed side walls;
a folding auger assembly having upper and lower auger assembly portions connected by a joint assembly, said lower auger assembly portion having a lower auger housing with first and second ends and a lower auger portion rotatably disposed in said lower auger housing, and said upper auger assembly portion having an upper auger housing with first and second ends and an upper auger portion rotatably disposed in said upper auger housing, wherein said first end of said lower auger housing has an intake opening proximate a bottom of said container to receive grain and said second end of said lower auger housing is disposed substantially at a front corner of said container where one of said laterally opposed side walls intersects the front wall of the container;

wherein said first end of said upper auger housing is disposed adjacent said second end of said lower auger housing and said second end of said upper auger housing has a discharge portion to discharge grain from said container;

wherein said joint assembly defines a pivot axis about which said upper auger assembly portion is pivotable relative to said lower auger assembly portion between an operating position in which said first end of said upper auger housing abuts said second end of said lower auger housing to permit grain to be discharged from said container and a transport position in which said upper auger assembly portion extends along said one of said laterally opposed side walls defining said front corner to facilitate transporting said grain cart;

wherein a longitudinal axis of said lower auger assembly portion extends upwardly, forwardly, and laterally outward relative to said front corner of said container when in said operating position and wherein a longitudinal axis of said upper auger assembly portion extends upwardly, forwardly, and laterally outward relative to said front corner of said container when in said operating position;

wherein said upper auger assembly portion includes a first auger coupling portion and said lower auger assembly portion includes a second auger coupling portion, and wherein at least one of said first and second auger coupling portions is connected to a joint that allows the transfer of rotational motion;

wherein said first auger coupling portion is configured to releasably engage with said second auger coupling portion in said operating position, and said first auger coupling portion is configured to be disengaged from said second auger coupling portion;

wherein said grain cart further comprises a hitch for allowing said grain cart to be towed, and wherein said discharge portion is forward of said hitch when in said operating position, wherein said discharge portion is forward of said hitch when in said operating position by a first distance greater than or equal to 60 inches;

wherein the lower auger portion forms an angle with the upper auger portion when in mand 55°. the transport position, such that the angle is between 25° 22°.

15. The grain cart of claim 14, wherein the angle is between 30° and 40°.

16. The grain cart of claim 14, wherein the angle is approximately 37°.

* * * * *